United States Patent
Li et al.

(10) Patent No.: US 9,317,280 B2
(45) Date of Patent: Apr. 19, 2016

(54) METHOD, EQUIPMENT AND SYSTEM OF INCREMENTAL UPDATE

(71) Applicant: Tencent Technology (Shenzhen) Company Limited, Shenzhen (CN)

(72) Inventors: Yang Li, Guangdong (CN); Tingyong Tang, Guangdong (CN); Wei Li, Guangdong (CN); Zhipei Wang, Guangdong (CN); Kai Zhang, Guangdong (CN); Xin Qing, Guangdong (CN); Xi Wang, Guangdong (CN); Sirui Liu, Guangdong (CN); Huijiao Yang, Guangdong (CN); Ying Huang, Guangdong (CN); Yulei Liu, Guangdong (CN); Cheng Feng, Guangdong (CN); Bo Hu, Guangdong (CN); Ruiyi Zhou, Guangdong (CN); Lei Guan, Guangdong (CN); Bosen He, Guangdong (CN); Ning Ma, Guangdong (CN); Yingge Li, Guangdong (CN); Hao Tang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/316,158

(22) Filed: Jun. 26, 2014

(65) Prior Publication Data

US 2015/0220317 A1     Aug. 6, 2015

Related U.S. Application Data

(63) Continuation of application No. PCT/CN2013/090082, filed on Dec. 20, 2013.

(30) Foreign Application Priority Data

Jun. 25, 2013   (CN) .......................... 2013 1 0256697

(51) Int. Cl.
G06F 9/44        (2006.01)
G06F 9/445       (2006.01)

(Continued)

(52) U.S. Cl.
CPC .. *G06F 8/65* (2013.01); *G06F 8/61* (2013.01); *G06F 8/68* (2013.01); *G06F 17/30076* (2013.01); *H04L 67/10* (2013.01)

(58) Field of Classification Search
CPC ............... G06F 8/60; G06F 8/65; G06F 8/61; H04L 67/1095; H04L 67/34; H04L 67/2823; H04L 69/329
See application file for complete search history.

(56) References Cited

U.S. PATENT DOCUMENTS 7,814,474 B2 * 10/2010 Chen .......................... G06F 8/65
                                                            717/168
8,868,924 B1 * 10/2014 Filatov ...................... G06F 8/60
                                                            713/176

(Continued)

OTHER PUBLICATIONS

Marquardt et al., Versions, releases, and distribution, Oct. 2007, 1 page.*

(Continued)

*Primary Examiner* — Thuy Dao
(74) *Attorney, Agent, or Firm* — Brinks Gilson & Lione

(57) ABSTRACT

The disclosure discloses a method, equipment and system for incremental updates in the information processing technology. The method includes: unpacking a new version installation package to get a new version unpacked folder having a new version unpacked file and a new version signature subfolder having a new version unpacked file; obtaining header file information of the at least one new version unpacked, and converting a format of the header file information; packing the new version convert folder to a new version archive package and obtaining at one historical version archive package; generating and obtaining one differential file; and releasing the one differential file wherein the at least one differential file that is released is selected by a client that has memory and at least one processor to download and form a second new version installation package according to the at least one differential file that is downloaded.

19 Claims, 13 Drawing Sheets

(51) Int. Cl.
*G06F 17/30* (2006.01)
*H04L 29/08* (2006.01)

(56) References Cited

U.S. PATENT DOCUMENTS

| | | | | | |
|---|---|---|---|---|---|
| 8,910,139 | B2* | 12/2014 | Li | | G06F 21/572 |
| | | | | | 717/168 |
| 9,043,747 | B2* | 5/2015 | Eksten | | G06F 8/70 |
| | | | | | 709/219 |
| 2013/0239089 | A1* | 9/2013 | Eksten | | G06F 8/70 |
| | | | | | 717/120 |
| 2014/0258968 | A1* | 9/2014 | Brown et al. | | 717/103 |
| 2015/0160939 | A1* | 6/2015 | Filatov | | G06F 8/60 |
| | | | | | 713/187 |

OTHER PUBLICATIONS

Gu et al., SCOBA: source code based attestation on custom software, Dec. 2010, 10 pages.*

* cited by examiner

METHOD, EQUIPMENT AND SYSTEM OF INCREMENTAL UPDATE

CROSS-REFERENCE TO RELATED APPLICATIONS

This application is a continuation of International Application No. PCT/CN2013/090082, filed on Dec. 20, 2013, which claims priority to Chinese Patent Application No. 201310256697.4, filed on Jun. 25, 2013, both of which are hereby incorporated herein by reference in their entireties.

FIELD OF THE TECHNOLOGY

The present disclosure relates to the field of information processing technology, particularly relates to a method, equipment and system of incremental update.

BACKGROUND

The new version installation package of such software needs to be downloaded from the server-side through the Internet upon updating the software at the client-side. The client-side has to spend corresponding download time and traffic for downloading the new version installation package.

SUMMARY

The present disclosure provides a method, equipment and system of software update. The method includes: unpacking, by a device with one or more processors, a new version installation package of the software to get a new version unpacked folder having at least one new version unpacked file; obtaining, by the device, header file information of the at least one new version unpacked file in the new version unpacked folder, and converting a format of the header file information of the at least one new version unpacked file to a new version convert folder; packing, by the device, the new version convert folder to a new version archive package and obtaining at least one historical version archive package; according to the new version archive package and the at least one historical version archive package, generating and obtaining, by the device, at least one differential file; and releasing, by the device, the at least one differential file which the at least one differential file that is released is selected by a client that has memory and at least one processor to download and form a second new version installation package according to the at least one differential file that is downloaded.

The present disclosure provides a server for updating software, the server includes: memory; one or more processors; an unpacking module stored in the memory and to be executed by the one or more processors for unpacking a new version installation package to get a new version unpacked folder having at least one new version unpacked file; a first acquisition module stored in the memory and to be executed by the one or more processors for obtaining header file information of the at least one new version unpacked file in the new version unpacked folder; a transforming module stored in the memory and to be executed by the one or more processors for converting a format of the header file information of the at least one new version unpacked file to a new version convert folder; a packing module stored in the memory and to be executed by the one or more processors for packing the new version convert folder to a new version archive package; a second acquisition module stored in the memory and to be executed by the one or more processors for obtaining at least one historical version archive package; a generating module stored in the memory and to be executed by the one or more processors for generating and obtaining at least one differential file according to the new version archive package and the at least one historical version archive package; and a release module stored in the memory and to be executed by the one or more processors for releasing the at least one differential file which the at least one differential file that is released is selected by a client to download and form a second new version installation package according to the at least one differential file that is downloaded.

A method of software update is also provided in the present disclosure, the method includes:
acquiring, by a device having one or more processors, a historical version installation package that corresponds to the software installed on the device, and downloading a differential file corresponding to the historical version installation package from a server; unpacking, by the device, the historical version installation package, and getting a historical version unpacked folders which the historical version unpacked folder comprises at least one historical version unpacked file and a historical version signature subfolder comprising at least one historical version unpacked file; obtaining, by the device, header file information of the at least one historical version unpacked file, and converting a format of the header file information of the at least one historical version unpacked file to a historical version transformed folder; packing, by the device, the historical version transformed folder into a historical version archive file package, and getting a new version archive file package according to the historical version archive file package and the differential file; unpacking, by the device, the new version archive file package, and getting a new version transformed folder; obtaining, by the device, header file information of files in the new version transformed folder, and converting a format of the header file information of files to a plurality of new version unpacked files; and getting, by the device, the new version installation package based on the plurality of new version unpacked files.

The present disclosure also provides a client device for updating software, the client device includes: memory; one or more processors; a first acquisition module stored in the memory and to be executed by the one or more processors for acquiring a historical version installation package; a downloading module stored in the memory and to be executed by the one or more processors downloading a differential file corresponding to the historical version installation package from a server; a first unpacking module stored in the memory and to be executed by the one or more processors for unpacking the historical version installation package, and getting a historical version unpacked folders wherein the historical version unpacked folder comprises at least one historical version unpacked file and a historical version signature subfolder comprising at least one historical version unpacked file; a second acquisition module stored in the memory and to be executed by the one or more processors for header file information of the at least one historical version unpacked file in the historical version unpacked folder; a first transforming module stored in the memory and to be executed by the one or more processors for converting a format of the header file information of the at least one historical version unpacked file to a historical version transformed folder; a packing module stored in the memory and to be executed by the one or more processors for packing the historical version transformed folder into a historical version archive file package; a third acquisition module stored in the memory and to be executed by the one or more processors for acquiring a new version archive file package according to the historical version archive file package and the differential file; a second unpacking module stored in the memory and to be executed by the one or more processors for unpacking the new version archive file package, and getting a new version transformed folder; a fourth acquisition module stored in the memory and to be executed by the one or more processors for acquiring header file information of files in the new version transformed folder; a second transforming module stored in the memory and to be executed by the one or more processors for converting a format of the header file information of files in the new version transformed folder to a plurality of new version unpacked files; a fifth acquisition module stored in the memory and to be executed by the one or more processors for acquiring the new version installation package based on the plurality of new version unpacked files.

BRIEF DESCRIPTION OF THE DRAWINGS

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

The system and/or method may be better understood with reference to the following drawings and description. Non-limiting and non-exhaustive descriptions are described with reference to the following drawings. The components in the figures are not necessarily to scale, emphasis instead being placed upon illustrating principles. The figures described below are just some of examples of the present disclosure, and to the technical personnel with the ordinary skill in this field, other figures may also be obtained based on such figures with the premise that not contributing creative work.

Figure 1:
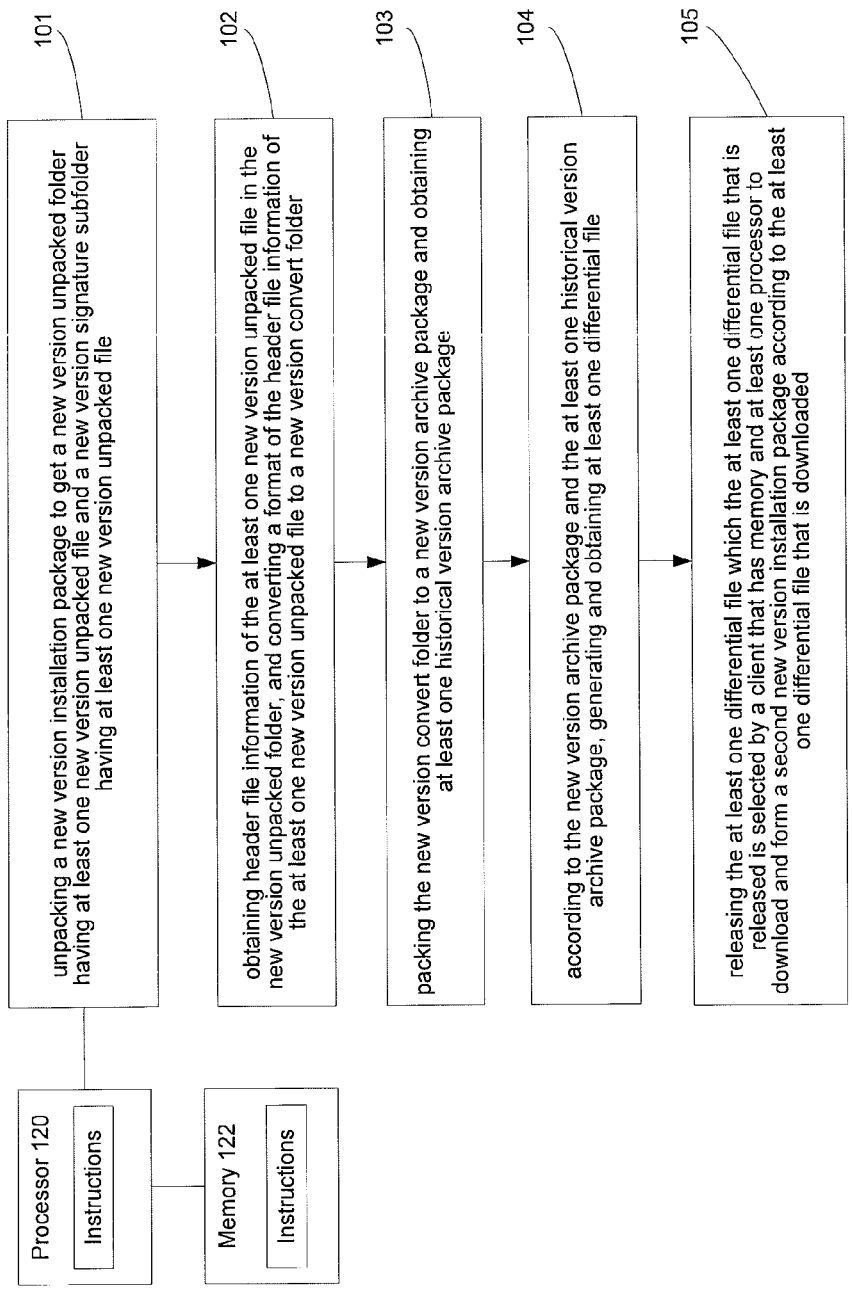
Figure 2:
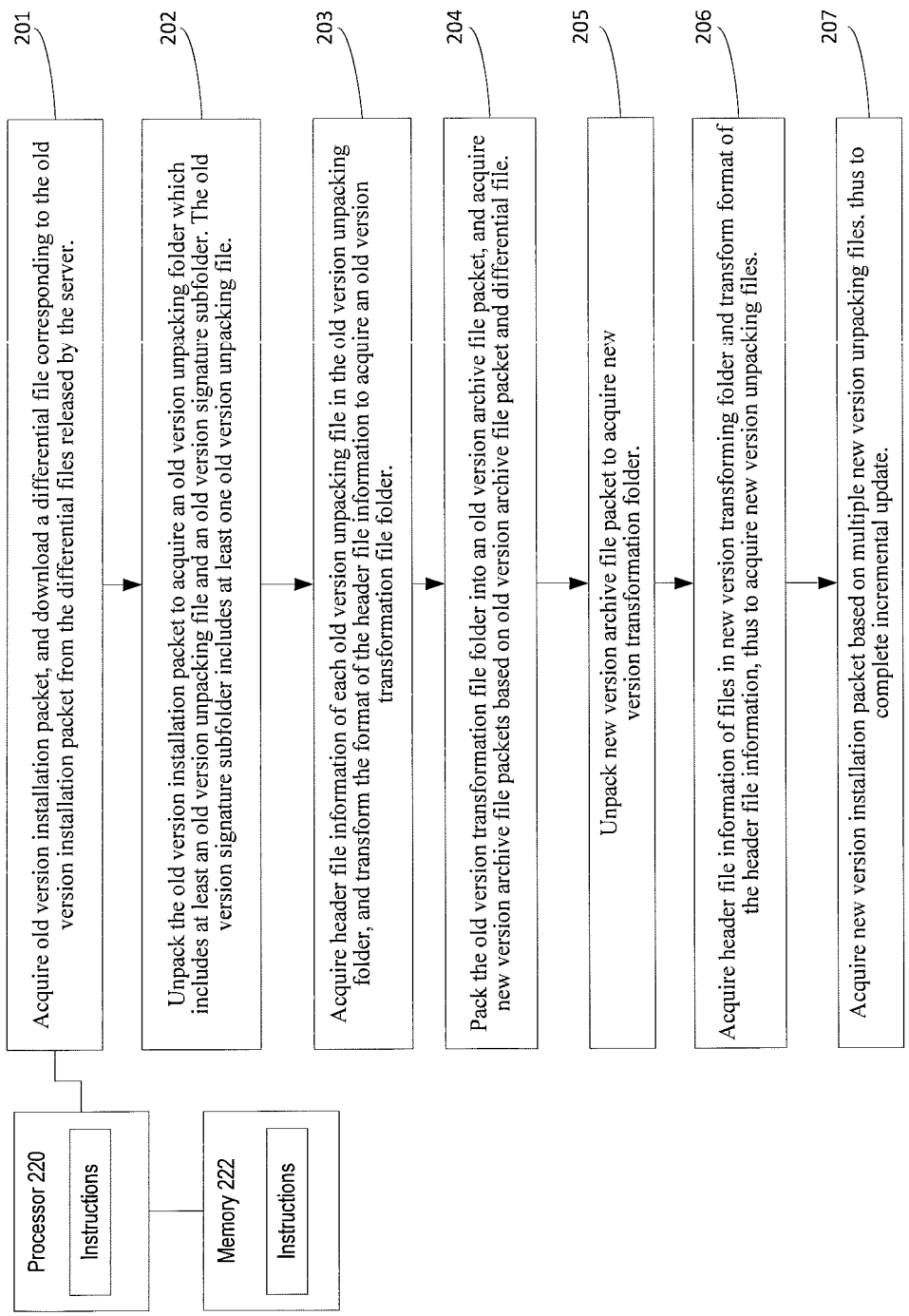
Figure 3A:
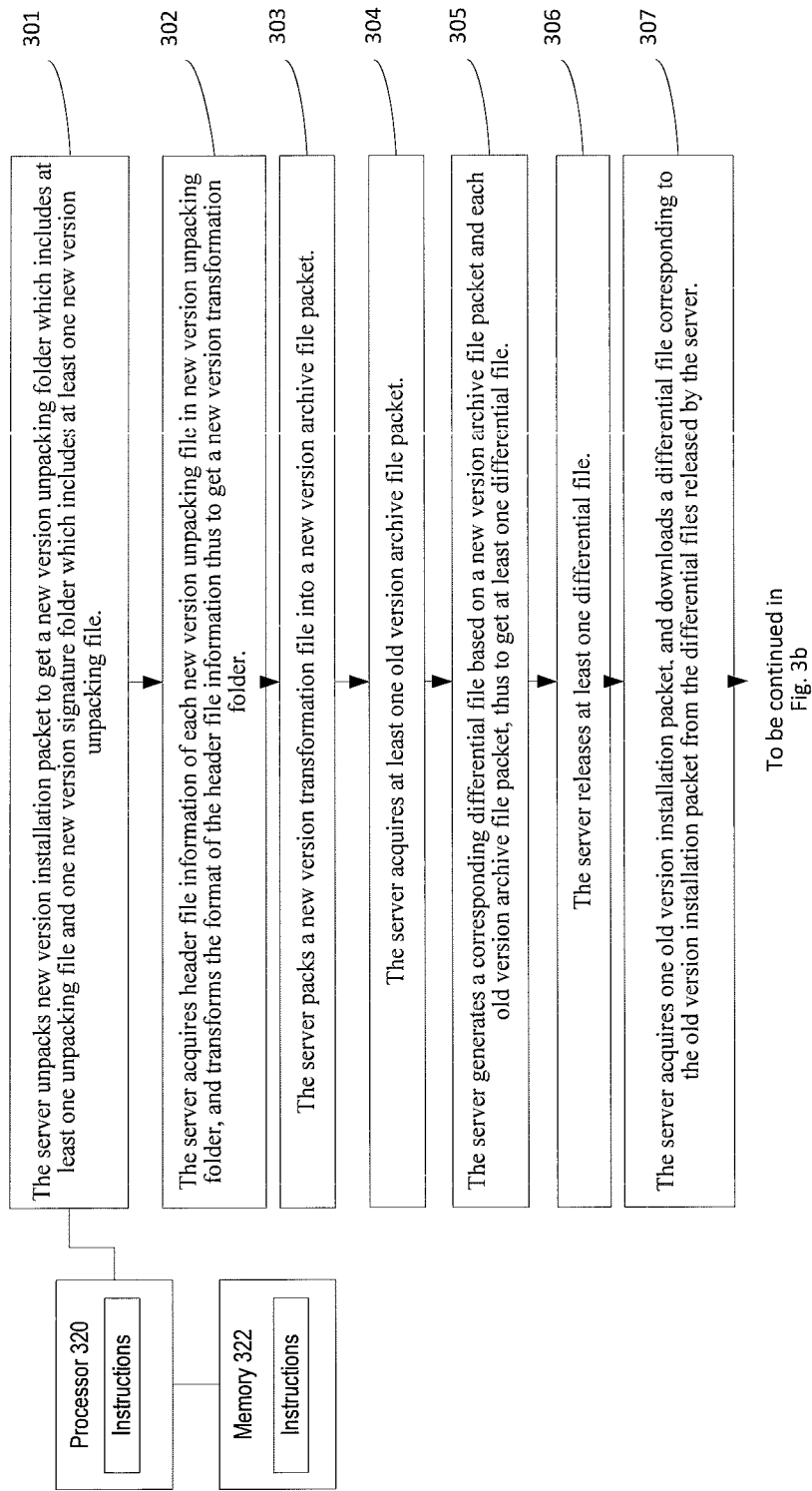
Figure 3B:
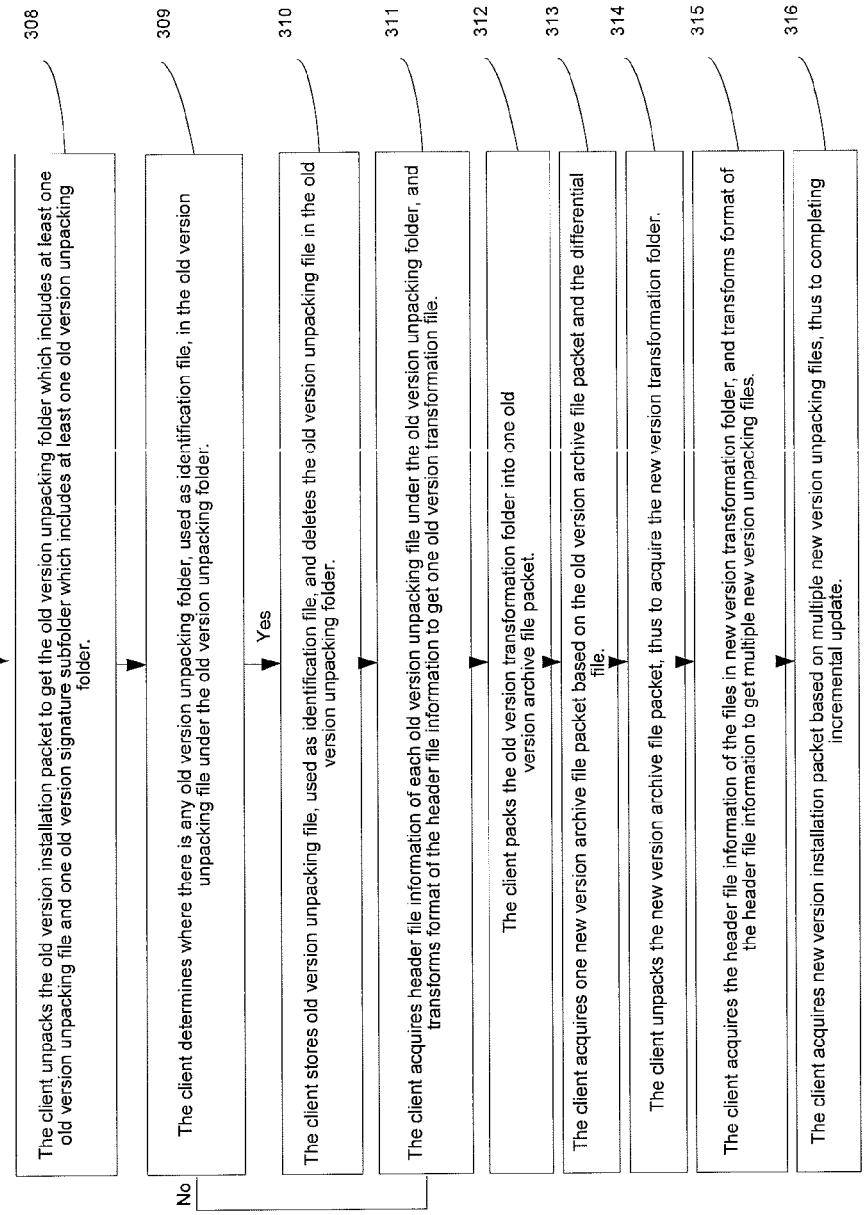

FIG. 1 is a flow chart of an incremental updating method provided by the present disclosure;

FIG. 2 is a flow chart of another incremental updating method provided by the present disclosure;

FIG. 3a is the first part of a flow chart of an additional incremental updating method provided by the present disclosure;

FIG. 3b is the second part of a flow chart of an additional incremental updating method provided by the present disclosure.

Figure 4:
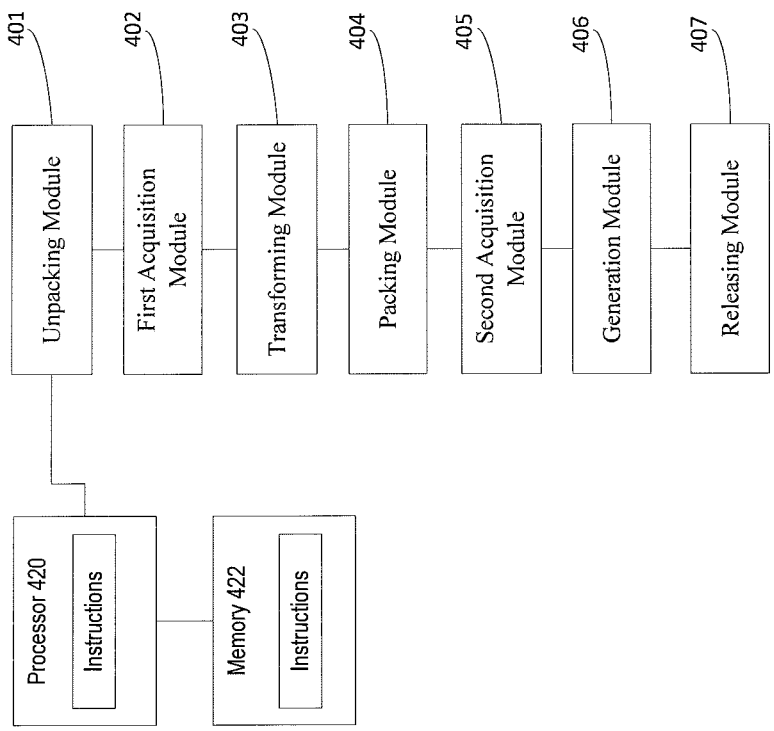
Figure 5:
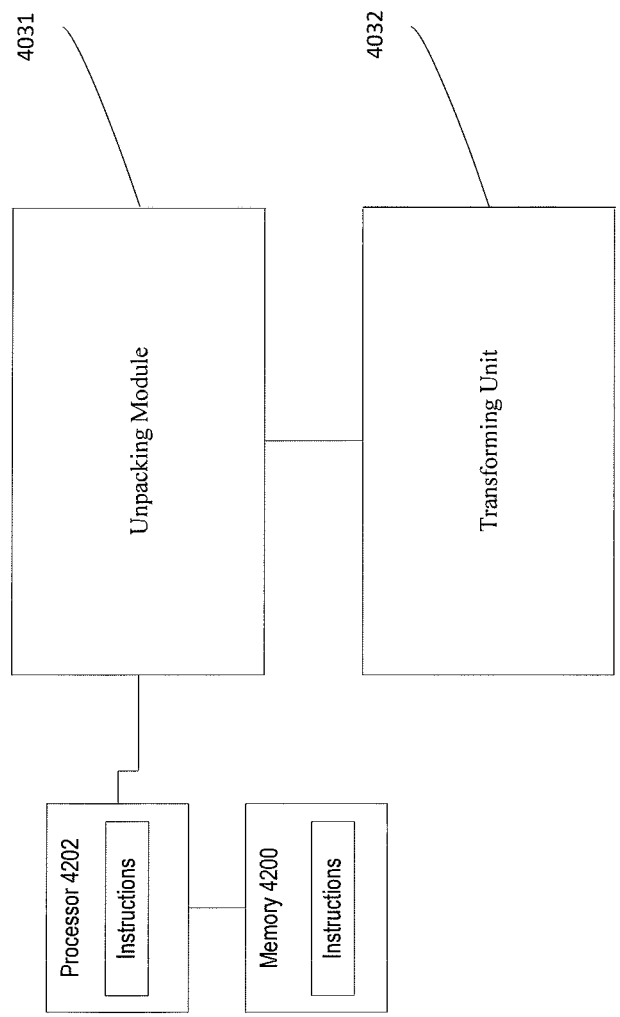
Figure 6:
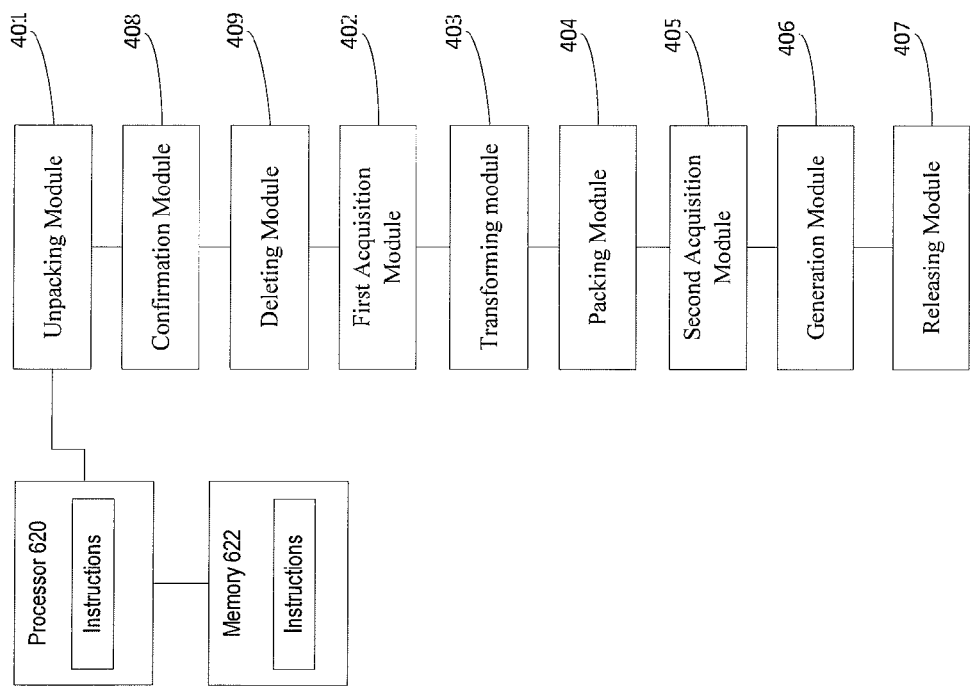
Figure 7:
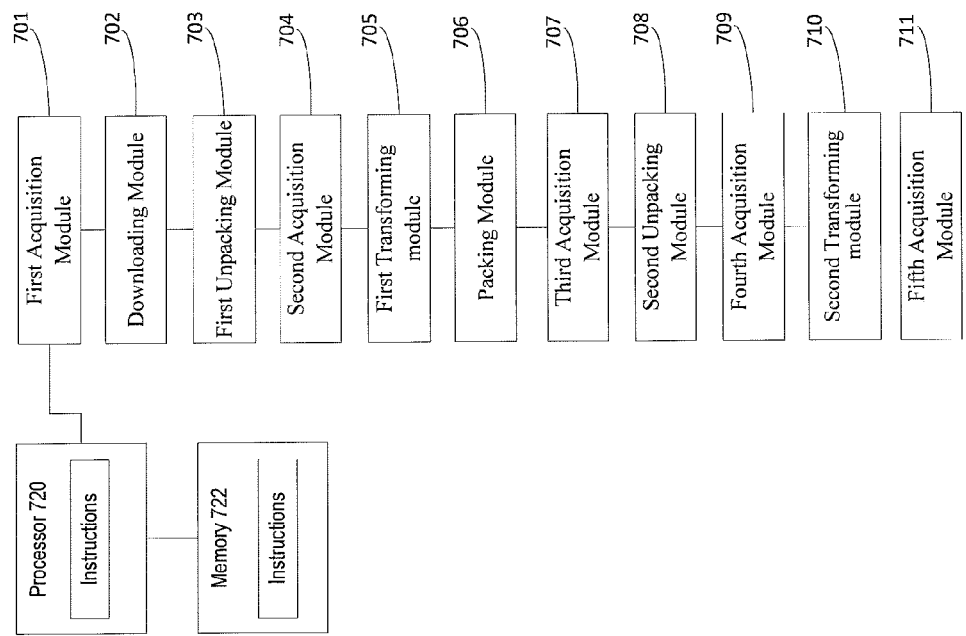
Figure 8:
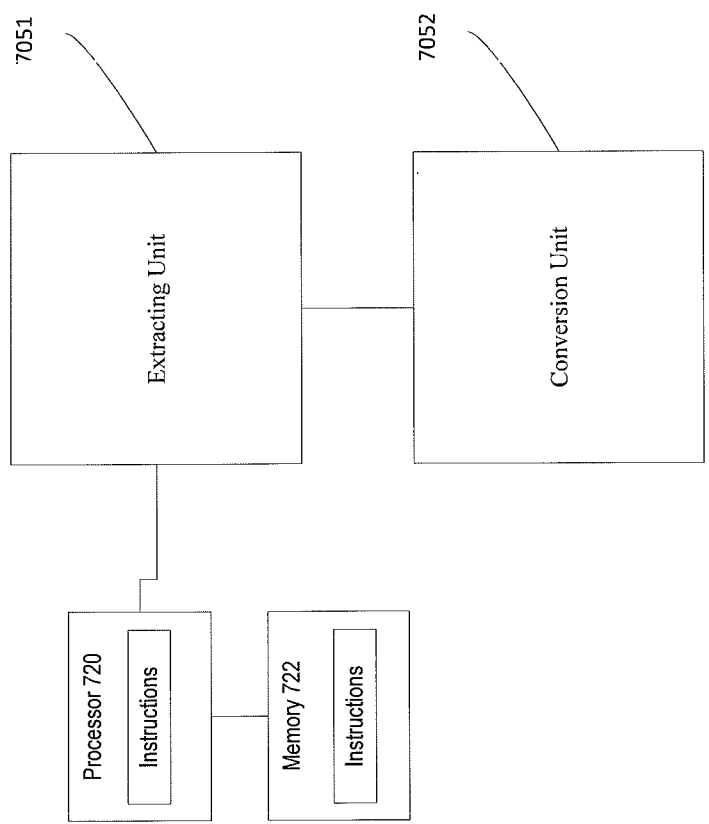
Figure 9:
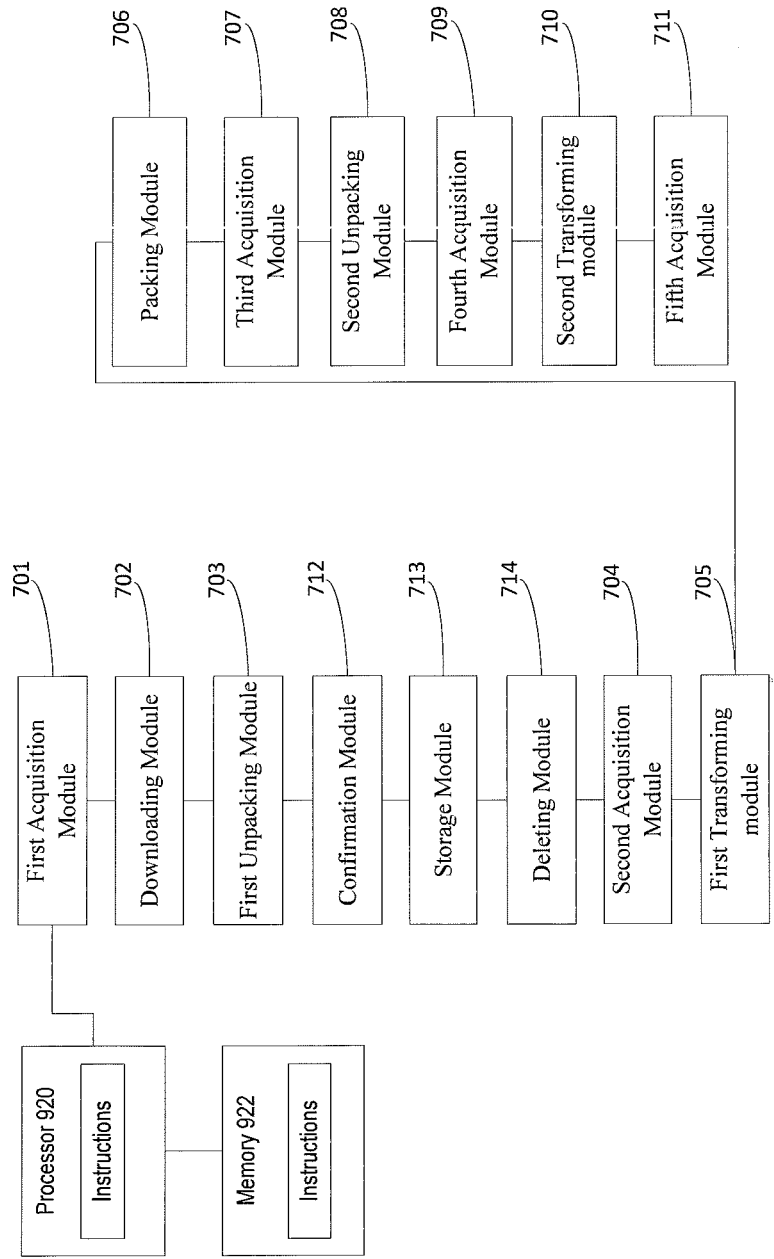
Figure 10:
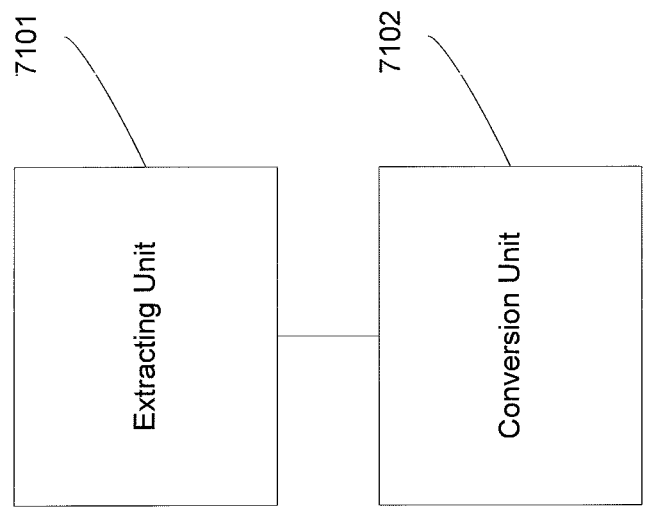
Figure 11:
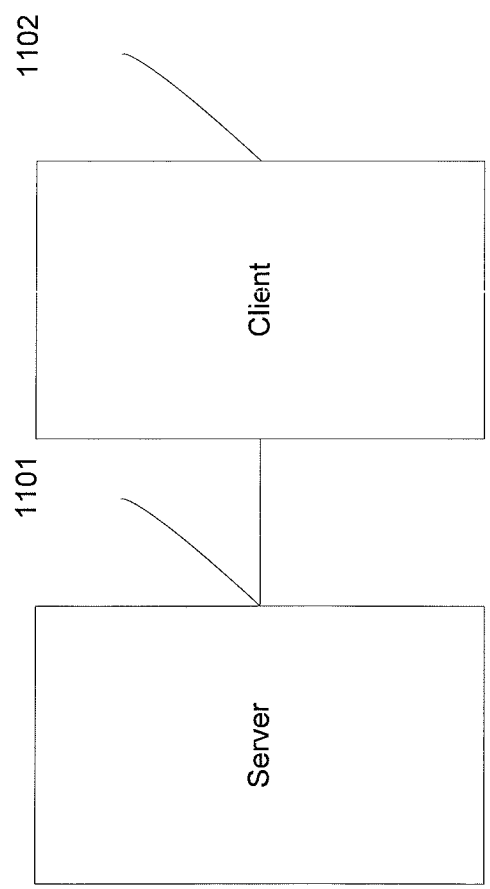
Figure 12:
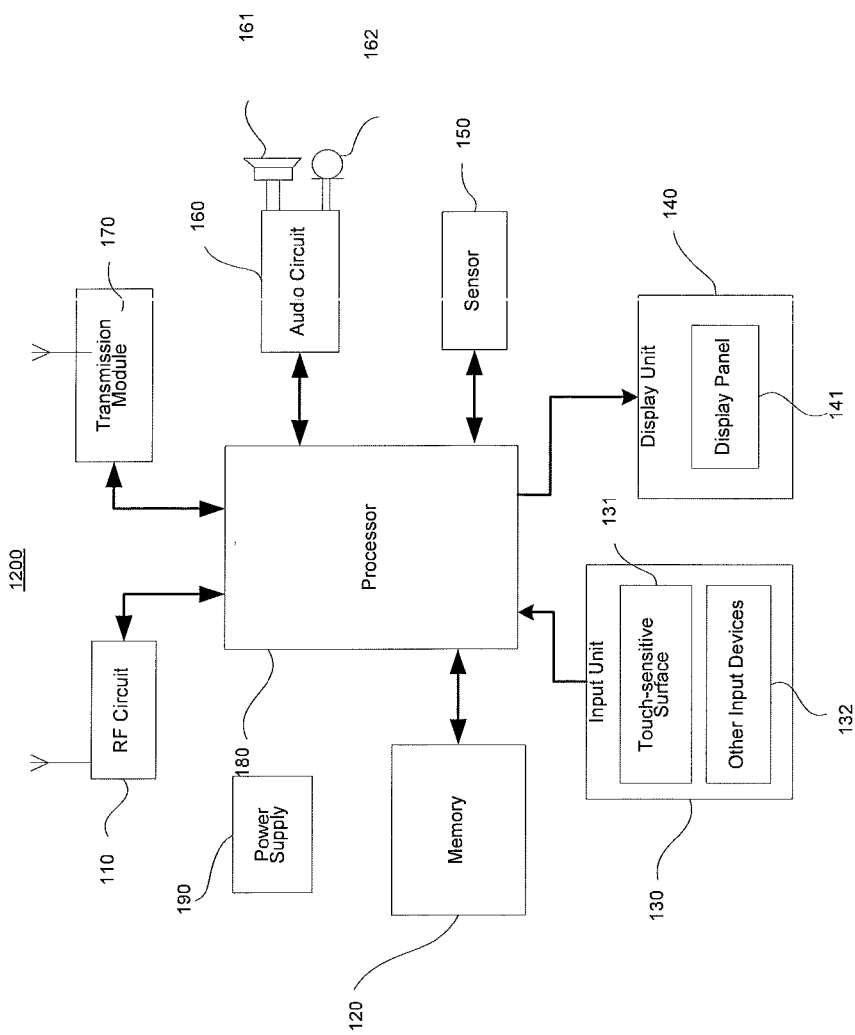

FIG. 4 is a structure diagram of an incremental updating server provided by the present disclosure;

FIG. 5 is a structure diagram of a transforming module provided by the present disclosure;

FIG. 6 is a structure diagram of another incremental updating server provided by the present disclosure;

FIG. 7 is a structure diagram of an incremental updating client provided by the present disclosure;

FIG. 8 is a structure diagram of a first transforming module provided by the present disclosure;

FIG. 9 is a structure diagram of another incremental updating client provided by the present disclosure;

FIG. 10 is a structure diagram of a second transforming module provided by the present disclosure;

FIG. 11 is a structure diagram of an incremental updating system provided by the present disclosure;

FIG. 12 is a structure diagram of a terminal provided by the present disclosure.

DETAILED DESCRIPTION

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

In the present disclosure, client, client device and client-side may be used exchangeably, and server, server device and server-side may also be referred to the same subject matters. Client, client device, client-side, server, server device and server-side may be software or hardware with memory and one or more processors.

In the software update with a client and a server, there is no change in most part between the files in the new version installation package and in the installation package whose version is already installed at the client-side, so most of the download time and traffic spent by the client-side is for such identical files. But the way of incremental updating needs to download only the differential files from the server-side which are different from the version already installed at the client-side, thus reduces the time and traffic spent by the client-side for downloading. As a result, the incremental updating method becomes an important updating method.

At present, the method of incremental updating is:

The server-side comprises the new version installation package, makes the compressed new version installation package generate the new version differential files corresponding to such historical version respectively with each compressed historical version installation package. The process of differential files' generation of the compressed new version installation package and any compressed historical version installation package is: the compressed new version installation package and such compressed historical version installation package make dispersion calculation through binary difference algorithm B compare and generate the differential files. Among which, the dispersion calculation is for finding out each file in the compressed new version installation package which is different from such compressed historical version installation package; pack all the different files to generate a differential file, and the format of such differential file is qbd. For instance, the compressed new version installation package is V2.1 installation package, the compressed historical version installation packages are V2.0 installation package and V1.0 install package; make dispersion calculation on the V2.1 installation package and V2.0 installation package through binary difference algorithm B compare and generate the differential file V2.1_V2.0.qbd, and make dispersion calculation on the V2.1 installation package and V1.0 installation package through binary difference algorithm B compare and generate the differential file V2.1_V1.0.qbd.

The client-side searches the differential files corresponding to the installed version from each differential file at the server-side based on the already installed version, and downloads the found differential files, merges the downloaded differential files with the installation package whose version is already installed, and generates a new version installation package. For instance, the version already installed at the client-side is V2.0, the client-side shall search the V2.1_V2.0.qbd in the differential files at the server-side, and download the V2.1_V2.0.qbd, merge the downloaded V2.1_V2.0.qbd with the installation package of the already installed V2.0, and generate the V2.1 installation package.

During the process of present disclosure, the inventor discovered that the above mentioned method of incremental updating is with at least the following disadvantages:

Since the new version installation package will be compressed before generating the differential files, but the compression algorithm will destroy the data structure in the new version installation package, which causes that, in addition to the differences of data itself, it also contains the structural differences in the differential files generated by using the compressed new version installation package and any compressed historical version installation package, and then the size of differential files is increased, and the time and traffic spent by the client-side for downloading such differential files are also increased.

The beneficial effects brought by the technical proposal provided by the present disclosure are:

Getting a new version unpacked folder through a new version installation package, and transforming a format of a header file of at least one new version unpacked file contained in the new version unpacked folder, and getting a new version transformed folder, packing the new version transformed folder into a new version archivefile package; and then generating a differential file based on the new version archive file package and a historical version archive file package; consequently, the differential file can be generated without destroying the data structure, and the content of a data structure difference in the differential file can be omitted, the size of the differential file can be reduced, and then the time and traffic spent by the client-side for downloading such differential files can be reduced.

For making the purpose, technical proposal and advantages of the present disclosure clearer, we will describe further the implementation methods of the present disclosure in combination with the attached figures as follows.

FIG. 1 provides a method of incremental update, the specific process of method provided in FIG. 1 is as follows:

101: Unpack the new version installation package, get the new version unpacked folder; the new version unpacked folder contains at least one new version unpacked file and new version signed subfolder, and the new version signed subfolder contains at least one new version unpacked file;

102: Get the header file information of each new version unpacked file in the new version unpacked folder, and transform the format of header file information of each new version unpacked file, thus get the new version transformed folder;

103: Pack the new version transformed folder into a new version archive file package, and get at least one historical version archive file package;

104: Generate a corresponding differential file based on the new version archive file package and each historical version archive file package, and get at least one differential file;

105: Release at least one differential file, make the client-side choose a differential file among the released at least one differential file to download, and form the new version installation package based on the downloaded differential file, thus complete the incremental update.

Each step may be executed by a device having one or more processors. For example, each step is embodied in instructions stored in memory 122 and to be executed by one or more processors 120.

Step 105 is an example of releasing the differential file, which may allow a client that runs the software may be able to download the differential file.

Another example of the method for incremental update is provided in FIG. 2, the specific process of method provided in FIG. 2 is as follows:

201: Get the historical version installation package, and download the differential file corresponding to the historical version installation package from the differential files released by the server;

202: Unpack the historical version installation package, and get the historical version unpacked folder; the historical version unpacked folder contains at least one historical version unpacked file and historical version signed subfolder;

and the historical version signed subfolder contains at least one historical version unpacked file;

203: Get the header file information of each historical version unpacked file in the historical version unpacked folder, and transform the format of header file information of each historical version unpacked file, thus get the historical version transformed folder;

204: Pack the historical version transformed folder into a historical version archive file package, and get a new version archive file package based on the historical version archive file package and the differential files;

205: Unpack the new version archive file package, and get the new version transformed folder;

206: Get the header file information of the files in the new version transformed folder, and transform the format of header file information of each file in the new version transformed folder, to get multiple new version unpacked files;

207: Get the new version installation package based on the multiple new version unpacked files, and complete the incremental update.

The method is to get the new version unpacked folder through the new version installation package, and transform the format of header file of the new version unpacked files contained in the new version unpacked folder, to get the new version transformed folder; pack the new version transformed folder into new version archive file package, and then generate the differential files based on the new version archive file package and historical version archive file package, thus generate the differential files without destroying the data structure, and the differences of data structure in differential files are omitted, the size of differential files is reduced, and then the time and traffic spent by the client-side for downloading such differential files are reduced.

One way to generate the differential file is to compare the original installation package with the new installation package and save the difference into the differential file. The signature files and channel files may not be part of the comparison. The compared files may be compressed and ECC information may also be included in the original and new installation packages.

In addition, one or more signature files under the signature folder may be used to authenticate the installation files within the installation packages. The signature files may not be part of the comparing process to generate the differential file.

To illustrate more clearly a kind of incremental updating method provided above, following example is provided:

In this example, the new version installation package is V2.1 installation package, the historical version installation packages are V2.0 installation package, V1.0 installation package.

To illustrate in details of this example, FIGS. 3*a* and 3*b* provides the specific process of this example:

301: The server unpacks the new version installation package, and gets the new version unpacked folder; the new version unpacked folder contains at least one new version unpacked file and new version signed subfolder, the new version signed subfolder contains at least one new version unpacked file;

For such step, the new version installation package is unpacked including but not limited to through the unpacking algorithm; this example does not restrict the specific unpacking algorithm of server to unpack the new version installation package.

In addition, since the installation package contains all the files for software installation, new version unpacked folder will begotten after unpacking the new version installation package.

Such new version unpacked folder contains at least one new version unpacked file, new version signed subfolder, and moreover, all the files contained in the new version unpacked folder are all the files for the installation of such software. Besides, the new version unpacked folder can also contain other content; this example does not restrict the specific content contained in the new version unpacked folder.

To be sure, with the development of personalized service, in order to satisfy various users on the various update demands on the same version of software, the same version of installation package will be modified according to the different needs of users, for forming the variation installation package of the same version installation package, called the channel package.

Meanwhile, in order to distinguish between the installation package and channel package, as well as the user the channel package is aiming at, identification file will be added in fixed position in the channel package, and corresponding identification parameters will be added in the signed subfolders. Among which, the identification file is for describing the information of such channel package, for instance, the user such channel package is aiming at, or other content.

The channel package may not be compared to generate the differential file.

This example does not restrict the specific information described by the identification file; the identification parameters refer to that such installation package contains the identification file. And this example does not restrict the specific value of identification parameters.

For instance, regarding the V2.1 installation package, generate the V2.1 channel package A in view of the demand of user A, there is identification file channel.ini in the folder assert contained in the V2.1 channel package A; add a parameter SHA1 to the signed subfolder manifest. mf which means that the V2.1 channel package A contains the channel.ini, and SHA1=1.

Surely, the position where the identification file is in can also be folder a, or other positions, this example does not restrict the specific position of identification file; the name and format of identification file can also be file a.b, or other file names and formats, this example does not restrict the specific file name and specific file format of identification file; the names of signed subfolders can also be other names, this example does not restrict the specific names of signed subfolders; the name of identification parameters can also be a, or other names, this example does not restrict the specific name of identification parameters; the specific values of the identification parameters can also be b, or other values, this example does not restrict the specific values of the identification parameters; the values of identification parameters can be generated based on the congruent relationship between the channel package and the user such channel package is aiming at, and can also be generated by other means, this example does not restrict the specific generation way of the values of identification parameters.

The differential files are applicable to both the channel package and the installation package; optionally, the server unpacks the new version installation package, and will confirm whether there is new version unpacked file serving as the identification file among the new version unpacked files contained in the new version unpacked folder after getting the new version unpacked folder; in case there is the new version unpacked file serving as the identification file, such new version unpacked file serving as identification file will be deleted from the new version unpacked folder.

Specifically, taking the above-mentioned V2.1 channel package A as an example, the V2.1 unpacked folder will be gotten after unpacking the V2.1 channel package A; there is identification file channel.ini in the assert subfolder contained in the V2.1 unpacked folder, delete the channel.ini file.

302: The server gets the header file information of each new version unpacked file contained in the new version unpacked folder, and transforms the format of header file information of each new version unpacked file, thus gets the new version transformed folder;

For such step, each new version unpacked file contains at least the header files, and the header file information of header files includes at least file length, file name length, calibration value, file name and the data content of such new version unpacked files, moreover, the file length, file name length, calibration value, file name and the data content are all in the second default format. This example does not restrict the specific content included in each new version unpacked file, this example does not restrict the specific content included in the header file information either, and this example also does not restrict the specific format content of the second default format.

In addition, this example does not restrict the specific transformation ways for transforming the format of header file information of each new version unpacked file. It is including but not limited to achieve transforming the format of header file information of each new version unpacked file through the following two steps:

Step I: Extract the file length, file name length, calibration value, file name and data content respectively from the header file information of each new version unpacked file;

Step II: Transform the formats of the extracted file length, file name length, calibration value, file name and data content respectively into the first default format.

For the Step II, this example does not restrict the specific form of the first default format, for instance, the first default format shown in Table 1.

TABLE 1

| Offset | Number of bytes (unit: byte) | Description |
|---|---|---|
| 0 | 4 | File length |
| 4 | 4 | File name length |
| 8 | 4 | Calibration value |
| 12 | M | File name |
| 12 + m | N | Data content |

To be sure, in order to shorten the execution time of Step 302, the Step 302 can be done in the form of data flow. Specifically, it can be achieved in the following process:

1. Extract the file length, file name length, calibration value, file name and data content from the header file information of the new version unpacked file 1;

2. Save in a memorizer the extracted file length, file name length, calibration value, file name and data content of new version unpacked file 1;

3. Transform the formats of file length, file name length, calibration value, file name and data content of saved new version unpacked file 1 respectively into the first default format; meanwhile, continue to extract the file length, file name length, calibration value, file name and data content from the header file information of new version unpacked file 2;

4. Save in a memorizer the extracted file length, file name length, calibration value, file name and data content of new version unpacked file 2; 5. Transform the formats of saved file length, file name length, calibration value, file name and data content of new version unpacked file 2 respectively into the first default format; meanwhile, continue to extract the file length, file name length, calibration value, file name and data content from the header file information of new version unpacked file 3; circulate in such way, until the formats of header file information of all the new version unpacked files are transformed.

The file name of new version unpacked file may also be other names, this example does not restrict the specific file names of the new version unpacked files.

In addition, the Step 302 of this example only transforms the format of header file information of each new version unpacked file contained in the new version unpacked folder. Therefore, the overall directory structure of the new version transformed folder after Step 302 is identical to the overall directory structure of the new version unpacked folder, and the content of files in new version transformed folder is identical to the content of files in new version unpacked folder.

For instance, there are the new version unpacked file 1, new version signed subfolder and subfolder 1 under the new version unpacked folder, The new version signed subfolder contains the new version unpacked file 2, the subfolder 1 contains the subfolder 2, the subfolder 2 contains the new version unpacked file 3.

The Step 302 is only for transforming respectively the format of header file information of new version unpacked file 1, the format of header file information of new version unpacked file 2 and the format of header file information of new version unpacked file 3, but does not make any change on the directory structure of new version unpacked folder as well as the content of new version unpacked file 1, content of new version unpacked file 2 and the content of new version unpacked file 3.

Therefore, the directory structure of new version transformed folder after Step 302 is: there are the new version unpacked file 1 whose header file information format has been transformed, new version signed subfolder and subfolder 1 under the new version transformed folder; the new version signed subfolder contains the new version unpacked file 2 whose header file information format has been transformed, the subfolder 1 contains the subfolder 2, the subfolder 2 contains the new version unpacked file 3 whose header file information format has been transformed, Moreover, the file contents of the new version unpacked file 1 whose header file information format has been transformed, the new version unpacked file 2 whose header file information format has been transformed and the new version unpacked file 3 whose header file information format has been transformed are identical to the file contents of the new version unpacked file 1, new version unpacked file 2 and the new version unpacked file 3 respectively.

The directory structure of new version unpacked folder can also be other structures, this example does not restrict the specific directory structure of new version unpacked folder. The names of the files or subfolders contained in the new version unpacked folder can also be other names, this example does not restrict the specific names of files or subfolders contained in the new version unpacked folder.

303: The server packs the new version transformed folder into a new version archive file package;

For such step, this example does not restrict the specific methods for the server to pack the new version transformed folders into a new version archive file package. This example does not restrict the specific format of new version archive file package either; for instance, the specific format of new version archive file package is qar (QArchive, file).

304: The server gets at least one historical version archive file package;

For such step, in case the updated version of installation package appears, such as the V3.0 installation package, the method provided by this example will be executed once again for incremental updating. At this point, the V3.0 installation package is exactly the new version installation package, and the V2.1 installation package is the historical version installation package; The V2.1 archive file package got from V2.1 installation package after the steps 301 to 303 is exactly the historical version archive file package.

Therefore, the acquisition process of historical version archive file package is identical to the acquisition process of new version archive file package, moreover, the historical version archive file package contains the historical version signed subfolders.

Meanwhile, in order to not repeat the process of getting the historical version archive file package through the historical version file package while conducting the incremental updating of new version, the new version archive file package will be saved when the new version archive file package is gotten, so that the present new version archive file package can be used directly as historical version archive file package upon conducting the incremental update once again through this example.

This example does not restrict the specific way of storing the new version archive file package, for instance, save the new version archive file package in the archive file package database.

In addition, the historical version archive file package is the archive file package of all the versions existed before the new version archive file package. This example does not restrict the specific acquisition way of getting at least one historical version archive file package either, it is including but not limited to, getting at least one historical version archive file package from the archive file package database.

For instance, the server gets the V2.0 archive file package and V1.0 archive file package from the archive file package database.

305: The server generates a corresponding differential file based on the new version archive file package and each historical version archive file package, and gets at least one differential file;

For such step, this example does not restrict the specific method for server to generate a corresponding differential file based on the new version archive file package and each historical version archive file package. For instance, generate the differential files from the new version archive file package and any of the historical version archive file packages through the Bsdiff (binary diff) algorithm.

Specifically, the V2.1 archive file package and V2.0 archive file package generate the differential file V2.1_V2.0.qbd, the V2.1 archive file package and V1.0 archive file package generate the differential file V2.1 V1.0.qbd. Of course, the specific names of differential files can also be other names, this example does not restrict the specific names of the differential files.

Optionally, the server can also delete firstly the historical version signed subfolders contained in each historical version archive file package respectively, and then generate a corresponding differential file based on the new version archive file package and the historical version archive file package whose historical version signed subfolders are deleted.

To be sure, the process that the server generates a corresponding differential file based on the new version archive file package and each historical version archive file package is to generate a corresponding differential file from the content existing in the new version archive file package but different to the content of historical version archive file package. That is to say, the content of the differential file is such content existing in the new version archive file package but not existing in the historical version archive file package.

For instance, there are file 1, signed subfolder and subfolder 1 under the new version archive file package; the signed subfolder contains the file 2 and file 3; the subfolder 1 contains the subfolder 2; the subfolder 2 contains the file 4; while there are file 1, signed subfolder and subfolder 1 under a certain historical version archive file package; the signed subfolder contains the file 2, the subfolder 1 contains the subfolder 2, and the subfolder 2 contains the file 5. As a result, the corresponding differential files generated from the new version archive file package and such historical version archive file package include at least the file 3 in the new version signed subfolder, and the file 4 in the subfolder 2 contained in the subfolder 1. And of course, the differential files may also include other content, this example does not restrict the specific content included in the differential files.

For another instance, there are file 1, signed subfolder and subfolder 1 under the new version archive file package; the signed subfolder contains the file 2 and file 3, the subfolder 1 contains the subfolder 2, the subfolder 2 contains the file 4; while there are file 1, signed subfolder and subfolder 1 under a certain historical version archive file package; the signed subfolder contains the file 2 and file 3, the subfolder 1 contains the subfolder 2, and the subfolder 2 contains the file 5. As a result, the corresponding differential files generated from the new version archive file package and such historical version archive file package include at least the file 4 in the subfolder 2 contained in subfolder 1.

For another instance, there are file 1, signed subfolder and subfolder 1 under the new version archive file package; the signed subfolder contains the file 2 and file 3, the subfolder 1 contains the subfolder 2, the subfolder 2 contains the file 4; while there are file 1, signed subfolder and subfolder 1 under a certain historical version archive file package; the signed subfolder contains the file 2, the subfolder 1 contains the subfolder 2, and the subfolder 2 contains the file 5. As a result, delete first the signed subfolders contained in such historical version archive file package, and then the corresponding differential files generated based on the new version archive file package and the historical version archive file package whose signed subfolders are deleted include the file 2 and file 3 in the new version signed subfolders, and the file 4 in the subfolder 2 contained in subfolder 1.

We can learn from the above-mentioned instances that, for the new version signed subfolders:

1. In case the server generates a corresponding differential file directly based on the new version archive file package and each historical version archive file package, such differential file may contain the signed subfolders or not contain the signed subfolders.

2. In case the server deletes first the historical version signed subfolders contained in each historical version archive file package respectively, and then generates a corresponding differential file based on the new version archive file package and the historical version archive file package whose historical version signed subfolders are deleted, such differential file will contain signed subfolders, moreover, such signed subfolders are the new version signed subfolders.

306: The server releases at least one differential file;

For such step, this example does not restrict the specific methods for the server to release at least one differential file, it is including but not limited to releasing at least one differential file through the existing release tools.

For instance, the server releases V2.1_V2.0.qbd and V2.1_V1.0.qbd after obtaining the differential files V2.1_V2.0.qbd and V2.1_V1.0.qbd through the above-mentioned steps.

307: The client-side gets the historical version installation package, and downloads the differential files corresponding to the historical version installation package from the differential files released by the server;

For such step, this example does not restrict the specific method for the client-side to get the historical version installation package. It is including but not limited to, getting the historical version installation package from the saved installation package.

In addition, in case the quantity of historical version installation package is at least two, you may get the version numbers of each historical version installation package, and select the historical version installation package corresponding to the biggest version number as the acquired historical version installation package.

For instance, the saved historical version installation package is V2.0 installation package, so get the V2.0 installation package as the historical version installation package.

For another instance, there are two historical version installation packages which have been saved, namely the V2.0 installation package, V1.0 installation package respectively. Since the version number of V2.0 installation package is V2.0, the version number of V1.0 installation package is V1.0, the biggest version number is V2.0, so choose the V2.0 installation package as the acquired historical version installation package.

In addition, this example does not restrict the specific methods for the client-side to download the differential files corresponding to the historical version installation package from the differential files released by the server. It is including but not limited to: since the server will release at least one differential file, therefore, the client-side chooses firstly through the internet the differential files corresponding to the historical version installation package among the differential files released by the server, and then download the chosen differential files.

For instance, taking the examples that the differential files released by the server are V2.1_V2.0.qbd and V2.1_V1.0.qbd, and the historical version installation package at client-side is V2.0 installation package, the client-side chooses the V2.1_V2.0.qbd corresponding to the V2.0 installation package among the V2.1_V2.0.qbd and V2.1_V1.0.qbd and downloads.

To be sure, the specific execution time of procedure for the client-side to download the differential files corresponding to the historical version installation package among the differential files released by the server only takes the execution after the client-side determines the historical installation package as an example.

Upon specific implementation, the specific execution time of procedure for the client-side to download the differential files corresponding to the historical version installation package among the differential files released by the server can be any time after the client-side determines the historical installation package and before Step 312; this example does not restrict the specific execution time of procedure for the client-side to download the differential files corresponding to the historical version installation package among the differential files released by the server.

308: The client-side unpacks the historical version installation package, and gets the historical version unpacked folder; the historical version unpacked folder contains at least one historical version unpacked file and historical version signed subfolder, the historical version signed subfolder contains at least one historical version unpacked file;

For such step, this example does not restrict the specific methods for the server to unpack the historical version installation package, it is including but not limited to unpacking the historical version installation package through the unpacking algorithm. See the process of unpacking new version installation package by the server shown in above-mentioned Step 301 for the specific unpacking procedure, which is not detailed at here.

309: The client-side confirms whether there is historical version unpacked file serving as identification file among the historical version unpacked files contained in the historical version unpacked folder; in case there is historical version unpacked file serving as identification file, execute the Step 310; in case there is no historical version unpacked file serving as identification file, execute the Step 311;

Specifically, confirm whether there is channel.ini in the assert subfolder contained in the historical version unpacked folder.

310: The client-side saves the historical version unpacked file as identification file, and deletes the historical version unpacked file serving as identification file from the historical version unpacked folder;

For such step, this example does not restrict the specific method for the client-side to save the historical version unpacked files serving as identification file. For instance, save the historical version unpacked file serving as identification file in the database.

311: The client-side gets the header file information of each historical version unpacked file contained in the historical version unpacked folder, and transforms the format of header file information of each historical version unpacked file, thus gets the historical version transformed folder;

For such step, the header file information of historical version unpacked file includes at least the file length, file name length, calibration value, file name and the data content, and all of which are in the second default format. This example does not restrict the specific content included in the header file information of historical version unpacked files.

In addition, this example does not restrict the specific methods for transforming the format of header file information of each historical version unpacked file. It is including but not limited to achieving format transformation on the header file information of each historical version unpacked file through the following two steps:

Step I: Extract the file length, file name length, calibration value, file name and the data content respectively from the header file information of each historical version unpacked file;

Step II: Transform the formats of extracted file length, file name length, calibration value, file name and the data content respectively into the first default format.

To be sure, in order to shorten the execution time of Step 311, the Step 311 can be done through the form of data flow. Specifically, it can be achieved in the following process:

1. Extract the file length, file name length, calibration value, file name and the data content from the header file information of historical version unpacked file 1;

2. Save in the memorizer the extracted file length, file name length, calibration value, file name and the data content of the historical version unpacked file 1;

3. Transform the formats of the file length, file name length, calibration value, file name and the data content of saved historical version unpacked file 1 respectively into the first default format; meanwhile, continue to extract the file length, file name length, calibration value, file name and data content from the header file information of historical version unpacked file 2;

4. Save in the memorizer the extracted file length, file name length, calibration value, file name and data content of historical version unpacked file 2;

5. Transform the formats of the saved file length, file name length, calibration value, file name and the data content of historical version unpacked file 2 respectively into the first default format; meanwhile, continue to extract the file length, file name length, calibration value, file name and data content from the header file information of historical version unpacked file 3; circulate in such way, until the formats of header file information of all the historical version unpacked files are transformed.

The file names of historical version unpacked files can also be other names, this example does not restrict the specific file names of the historical version unpacked files.

In addition, the Step 311 of this example only transforms the format of header file information of each historical version unpacked file contained in the historical version unpacked folder. Therefore, the overall directory structure of the historical version transformed folder after Step 311 is identical to the overall directory structure of the historical version unpacked folder, and the content of the files in historical version transformed folder is identical to the content of the files in historical version unpacked folder.

For instance, there are the historical version unpacked file 1, historical version signed subfolder and subfolder 1 under the historical version unpacked folder, The historical version signed subfolder contains the historical version unpacked file 2, the subfolder 1 contains the subfolder 2, the subfolder 2 contains the historical version unpacked file 3.

The Step 302 is only for transforming the format of header file information of historical version unpacked file 1, the format of header file information of historical version unpacked file 2 and the format of header file information of historical version unpacked file 3 respectively, but does not make any change on the directory structure of historical version unpacked folder as well as the content of historical version unpacked file 1, content of historical version unpacked file 2 and the content of historical version unpacked file 3.

Therefore, the directory structure of historical version transformed folder after Step 311 is: there are the historical version unpacked file 1 whose header file information format has been transformed, the historical version signed subfolder and subfolder 1 under the historical version transformed folder; the historical version signed subfolder contains the historical version unpacked file 2 whose header file information format has been transformed, the subfolder 1 contains the subfolder 2, the subfolder 2 contains the historical version unpacked file 3 whose header file information format has been transformed, Moreover, the contents of historical version unpacked file 1 whose header file information format has been transformed, the historical version unpacked file 2 whose header file information format has been transformed and the historical version unpacked file 3 whose header file information format has been transformed are identical to the contents of the historical version unpacked file 1, historical version unpacked file 2 and the historical version unpacked file 3 respectively.

The directory structure of historical version unpacked folder can also be other structures, this example does not restrict the specific directory structure of historical version unpacked folder. The names of the files or subfolders contained in the historical version unpacked folder can also be other names, this example does not restrict the specific names of files or subfolders contained in the historical version unpacked folder.

312: The client-side packs the historical version transformed folder into a historical version archive file package;

For such step, this example does not restrict the specific methods for the server to pack the historical version transformed folders into a historical version archive file package. This example does not restrict the specific format of historical version archive file package either, for instance, the specific format of historical version archive file package is gar.

313: The client-side gets the new version archive file package based on the historical version archive file package and the differential files;

For such step, this example does not restrict the specific methods for the server to get the new version archive file package based on the historical version archive file package and differential files. For instance, get the new version archive file package from historical version archive file package and differential files through the Bspatch (Patch merge tool).

Specifically, the V2.1 archive file package will be gotten from the V2.0 archive file package and V2.1_V2.0.gbd through Bspatch.

In addition, since there are two ways to get the differential files in Step 305, therefore, if the method of differential file generation in Step 305 is that the server deletes firstly the historical version signed subfolders contained in each historical version archive file package, and then generates a corresponding differential file based on the new version archive file package and the historical version archive file package whose historical version signed subfolders are deleted, in such step, the client-side may also delete firstly the historical version signed subfolders contained in the historical version archive file package, and then merge the historical version archive file package whose historical version signed subfolders are deleted with differential files, and get the new version archive file package.

The process for the client-side to get the new version archive file package based on the historical version archive file package and differential files is the process of merging the historical version archive file package and differential files.

Taking it as an example that, the method of generating differential files in Step 305 is that the server generates a corresponding differential file directly based on the new version archive file package and each historical version archive file package, and gets at least one differential file. In case there are file 1, signed subfolder and subfolder 1 contained in the historical version archive file package, the signed subfolder contains the file 2, the subfolder 1 contains subfolder 2, the subfolder 2 contains the file 5; While the differential files include at least the file 3 in historical version signed subfolder, the file 4 in subfolder 2 contained in subfolder1. Then the new version archive file package got from such historical version archive file package and differential files contains the file 1, signed subfolder and subfolder 1, the signed subfolder contains the file 2 and file 3, the subfolder 1 contains the subfolder 2, the subfolder 2 contains the file 4.

Taking it as another example that, the method of generating differential files in Step 305 is that the server generates a corresponding differential file directly based on the new version archive file package and each historical version archive file package, and gets at least one differential file. In case there are file 1, signed subfolder and subfolder 1 contained in the historical version archive file package, the signed subfolder contains the file 2 and file 3, the subfolder 1 contains subfolder 2, and the subfolder 2 contains the file 5; while the differential files include at least the file 4 in subfolder 2 contained in subfolder1.

Then the new version archive file package got from such historical version archive file package and differential files contains the file 1, signed subfolder and subfolder 1, the signed subfolder contains the file 2 and file 3, the subfolder 1 contains the subfolder 2, the subfolder 2 contains the file 4.

Once more, taking it as another example that, the method of generating differential files in Step 305 is that the server deletes firstly the historical version signed subfolders contained in each historical version archive file package respectively, and then generates a corresponding differential file based on the new version archive file package and the historical version archive file package whose historical version signed subfolders are deleted; in case there are file 1, signed subfolder and subfolder 1 contained in the historical version archive file package, the signed subfolder contains the file 2, the subfolder 1 contains subfolder 2, and the subfolder 2 contains the file 5; while the differential files include at least the file 2 and file 3 in the historical version signed subfolder, the file 4 in subfolder 2 contained in the subfolder1.

Then delete firstly the historical version signed subfolders contained in the historical version archive file package, and then merge the historical version archive file package whose historical version signed subfolders are deleted with the differential files, and the acquired new version archive file package contains the file 1, signed subfolder and subfolder 1, the signed subfolder contains the file 2 and file 3, the subfolder 1 contains the subfolder 2, the subfolder 2 contains the file 4.

We can learn from the above-mentioned examples that, for the historical version signed subfolders:

1. If the method of generating differential files in Step 305 is that the server generates a corresponding differential file directly based on the new version archive file package and each historical version archive file package, and gets at least one differential file, then the differential file may include the signed subfolders, or may not include the signed subfolders.

1) In case the differential files do not include the signed subfolders, the client-side will get the new version archive file package based on the historical version archive file package and differential files, by this time, the files in the new version signed subfolders contained in the new version archive file package are the files in historical version signed subfolders contained in the historical version archive file package.

2) In case the differential files include the signed subfolders, the client-side will get the new version archive file package based on the historical version archive file package and differential files, by this time, the files in the new version signed subfolders contained in the new version archive file package are the merger of the files in historical version signed subfolders contained in the historical version archive file package and the files in the signed subfolders included in the differential files.

2. If the method of generating differential files in Step 305 is that the server deletes firstly the historical version signed subfolders contained in each historical version archive file package respectively, and then generates a corresponding differential file based on the new version archive file package and the historical version archive file package whose historical version signed subfolders are deleted; the differential files will include the signed subfolders, moreover, the included signed subfolders are the new version signed subfolders.

1) In case the client-side gets the new version archive file package based on the historical version archive file package and differential files, by this time, the files in the new version signed subfolders contained in the new version archive file package are the merger of the files in the historical version signed subfolders contained in the historical version archive file package and the files in the new version signed subfolders included in the differential files; if the files in the historical version signed subfolders contained in the historical version archive file package are identical to the files in the new version signed subfolders included in the differential files, retain the files in any version of signed subfolder.

2) In case delete firstly the historical version signed subfolders contained in the historical version archive file package, and then merge the historical version archive file package whose historical version signed subfolders are deleted with the differential files, get the new version archive file package; by this time, the files in the new version signed subfolders contained in the new version archive file package are the files in new version signed subfolders included in the differential files.

314: The client-side unpacks the new version archive file package, and gets the new version transformed folder;

For such step, this example does not restrict the specific unpacking methods for the client-side to unpack the new version archive file package and get the new version transformed folders.

315: The client-side gets the header file information of the files in the new version transformed folders, and transforms the format of header file information of each file in the new version transformed folders, to get multiple new version unpacked files;

For such step, the header file information of the files in the new version transformed folders includes at least the file length, file name length, calibration value, file name and the data content, and all of which are in the first default format.

In addition, this example does not restrict the specific methods for transforming the format of header file information of each file in the new version transformed folder; it is including but not limited to achieving the format transformation of header file information of each file in the new version transformed folders through the following two steps:

Step I: Extract the file length, file name length, calibration value, file name and data content respectively from the header file information of the files in each new version transformed folder;

Step II: Transform the formats of the extracted file length, file name length, calibration value, file name and data content respectively into the second default format.

In order to shorten the execution time of Step 315, the Step 315 can be done in the form of data flow. Specifically, it can be achieved in the following process:

1. Extract the file length, file name length, calibration value, file name and data content from the header file information of file 1;

2. Save in a memorizer the extracted file length, file name length, calibration value, file name and data content of file 1;

3. Transform the formats of saved file length, file name length, calibration value, file name and data content of file 1 respectively into the second default format; meanwhile, continue to extract the file length, file name length, calibration value, file name and data content from the header file information of file 2;

4. Save in a memorizer the extracted file length, file name length, calibration value, file name and data content of file 2;

5. Transform the formats of saved file length, file name length, calibration value, file name and data content of file 2 respectively into the second default format; meanwhile, continue to extract the file length, file name length, calibration value, file name and data content from the header file information of file 3; circulate in such way, until the formats of header file information of all files are transformed.

The file names in new version transformed folders can also be other names, this example does not restrict the specific names of the files in the new version transformed folders.

In addition, the Step 315 of this example only transforms the format of header file information of each file contained in the new version transformed folders, therefore, the content of new version unpacked files got after Step 315 is identical to the content of the files contained in the new version transformed folders. Meanwhile, it transforms the format of header file information of each file in the new version transformed folders into the second default format, therefore, the format of header file information of new version unpacked files got after Step 315 is identical to the format of the header file information of the server's new version unpacked files.

316: The client-side gets the new version installation package based on multiple new version unpacked files, and completes the incremental update.

For such step, this example does not restrict the specific methods for the client-side to get the new version installation package based on multiple new version unpacked files. For instance, pack multiple new version unpacked files to generate the new version installation package.

Since the steps from 301 to 315 of this example only transform the header file format of files, do not make any change on the file content and file structure, and the header file format of new version unpacked files after Step 315 is identical to the header file format of new version unpacked files in the new version installation package unpacked in Step 301. Therefore, the new version installation package got from Step 316 and the new version installation package unpacked in Step 301 are identical both on the data content and the data format. Meanwhile, also because the method provided by this example transforms the header file format of files, but does not change the file content and file structure, which makes that the differential files generated in Step 305 include the difference content of the data itself, but not include the difference content of data structure.

The method provided by this example is to get the new version unpacked folders through new version installation package, and transform the format of header file of the new version unpacked files in the new version unpacked folders, get the new version transformed folders; pack the new version transformed folders into the new version archive file package, and then generate differential files based on the new version archive file package and historical version archive file package, thus generate the differential files without destroying the data structure, and the difference content of data structure in differential files is omitted, the size of differential files is reduced, and then the time and traffic spent by the client-side for downloading such differential files are reduced.

FIG. 4 shows an example of a server involving the incremental update mentioned in above example 1 or example 2. FIG. 4 includes:

Unpacking module 401, which is used to unpack new version installation package into new version unpack folder. The new version unpack folder includes at least one new version unpacking file and a new version signature subfolder; and the new version signature subfolder includes at least one new version unpacked file;

The first acquisition module 402, which is used to acquire the header file information of each new version unpacking file in the new version unpack folder;

Transforming module 403, which is used to converse the header file information of each new version unpacking file into a new version conversion folder.

Packing module 404, which is used to pack new version conversion folder, derived from the transforming module 403, into a new version archive file packet;

The second acquisition module 405, which is used to acquire at least one old version archive file packet;

Generation module 406, which is used to generate at least a corresponding differential file, based on the new version archive file packet and each old version archive file packet that derived from packing module 404;

Releasing module 407, which is used to issue at least one differential file derived from generation module 406, enabling the client to download at least a differential file and to form a new version installation package based on the downloaded differential file, before completing incremental update.

All modules in FIG. 4 may be stored in memory 422 and to be executed by one or more processors 420.

Further, the header file information of the new version Unpacking file should at least include file length, filename length, checksum value, filename and contents. All of these should be in the second preset format. Please refer to FIG. 5 for transforming module 403, which includes:

Extracting unit 4031, which is used to extract file length, filename length, checksum value, filename and contents from the header file data of each new version unpacked file;

Conversion unit 4032, which is used to transform the format of file length, filename length, checksum value, filename and contents that extracted by extracting unit 4031 into the first preset format.

All modules in FIG. 5 may be stored in memory 4200 and to be executed by one or more processors 4202.

Further, old version archive file packet includes old version signature subfolder. The acquisition process of old version archive file packet is identical with that of new version ones;

Generation module 406, which is used to delete the old version signature subfolder in each old version archive file packet, and to generate a corresponding differential file according to the new version archive file packet and the old version archive file packet in the deleted old version signature subfolder.

This server depicted in FIG. 6 also includes:

Confirmation Module 408, which is used to verify whether there is any new version Unpacking file in the new version unpack folder that can be used as identification file;

Deleting module 409, which is used to delete the new version unpacked file, as identification file, from the new version unpack folder when confirmation module 408 confirms that there is a new version unpacking file.

The server here exemplified gets a new version unpack folder via new version installation package, and transforms format of the header file of the new version unpacking file in the new version unpack folder to generate a new version conversion folder which will be packed into a new version archive file packet later.

After that, a differential file will be generated on basis of the new version archive file package and the old version archive file package, without destroying data structure. This saved the differential data structure contents within differential file and reduced the size of differential file, thus reduced time and flow needed to download the differential file.

FIG. 7 shows an example of a client. In this example, the server is used to execute the content run on the client in the incremental update mentioned in previous examples. The client in FIG. 7 includes:

The first acquisition module 701, which is used to acquire the old version installation package;

Downloading module 702, which is used to download the differential file corresponding to the old version installation package acquired from the first acquisition module from the differential file issued from the server;

The first Unpacking module 703, which is used to unpack the old version installation package acquired from the first acquisition module 701 into the old version unpack folder. The old version unpack folder includes at least one old version Unpacking file and an old version signature subfolder. The old version signature subfolder includes at least one old version unpacked file;

The second acquisition module 704, which is used to acquire header file information of each old version Unpacking file in the old version unpack folder;

The first transforming module 705, which is used to transform format header file information of each old version unpacked file, thus to get an old version conversion folder;

Packing module 706, which is used pack the old version conversion folder got from the first transforming module 705 into an old version archive file packet;

The third acquisition module 707, which is used to acquire new version archive file packet according to the old version archive file packet and the differential file;

The second unpacking module 708, which is used to unpack the new version archive file packet into a new version conversion folder;

The fourth acquisition module 709, which is used to acquire header file information of the file in the new version conversion folder that derived from the second Unpacking module 708;

The second transforming module 710, which is used to transform format of header file information of each file in the new version conversion folder, thus to acquire multiple new version unpacked files;

The fifth acquisition module 711, which is used to acquire new version installation package according to multiple new version unpacked files, thus to completing incremental update.

Further, there should be at least two old version installation packages;

The first acquisition module 701, which is used to acquire version numbers of all old version installation packages, and choose the old version installation package with the greatest version number as the acquired old version installation package.

Additionally, header file information of old version Unpacking file at least includes file length, filename length, checksum value, filename and contents, all in the second preset format. See FIG. 8 for the first transforming module 705, which includes:

Extracting unit 7051, which is used to extract file length, filename length, checksum value, filename and contents of header file information for each old version Unpacking file;

Conversion unit 7052, which is used to transform format of file length data, filename length, checksum value, filename and contents that extracted from extracting unit 7051 into the first preset format.

Aside by, the third acquisition module 707, which is used to delete old version signature subfolder in old version archive file packet, and to combine the old version archive file packet, with the old version signature subfolder deleted, with the differential file, to acquire a new version archive file packet.

Refer to FIG. 9 for the client, which includes:

Confirmation Module 712, which is used to verify whether there is any old version Unpacking file, used as identification file, in the old version unpack folder;

Storage module 713, which is used to store an old version Unpacking file, using as identification file, when Confirmation Module 712 verifies that there is any old version Unpacking file being used as identification file;

Deleting module 714, which is used to delete the old version Unpacking file, used as identification file, from the old version unpack folder.

Header file information of the file in the new version conversion folder at least includes file length, filename length, checksum value, filename and contents, and they are all in the first preset format. Refer to FIG. 10 for the second transforming module 710, which includes:

Extracting unit 7101, which is used to extract file length, filename length, checksum value, filename and contents of header file information of files in each new version conversion folder; Conversion unit 7102, which is used to transform format of file length, filename length, checksum value, filename and contents that extracted by extracting unit into the second preset format.

All modules depicted in FIGS. 7-9 may be stored in memory and to be executed by one or more processors.

The client depicted in this example acquired new version Unpacking folder through new version installation package, and transformed format of header file of the new version Unpacking file, thus to get a new version conversion folder, which would be packed into a new version archive file packet. A differential file is then generated based on a new version archive file packet and an old version archive file packet, without destroying data structure. This discarded differential data structure of the differential file, reduced size of differential file, and further cut down the time and flow for the client to download this differential file.

FIG. 11 shows an additional example of the incremental update system. This system is used to execute incremental update mentioned in example 1 or example 2 above. The system, shown in FIG. 11 includes:

Server 1101 and client 1102;

Server 1101 is shown in example 3;

Client 1102 is shown in example 4.

System in this example gets new version Unpacking folder via new version installation package, and transforms format of the header file of new version Unpacking file in the new version Unpacking fold to get new version conversion folder, Pack the new version conversion folder into a new version archive file packet, and generate a differential file according to the new version archive file packet and the old version archive file packet, without destroying data structure.

This discarded differential data structure of the differential file, reduced size of differential file, and further cut down the time and flow for the client to download this differential file.

FIG. 12 shows an example of a structure of a terminal with touch-sensitive surface. This disclosure may execute above object handling. To be specific:

Terminal 1200 may include RF (Radio Frequency) circuit 110, one or more computer-readable memory 120, input unit 130, display unit 140, sensor 150, audio circuit 160, transmission module 170, processor 180 with one or more cores, and power supply 190. Technicians of this field can comprehend that structure of the terminal in FIG. 12 is not limited in term of parts and their arrangement.

RF CIRCUIT 110 can be used to receive/send message or voice signal. It delivers data from base stations, and furthers it to one or more processor 180 for processing; additionally, it can send uplink data to base stations as well. Usually, RF circuit 110 includes, but not limited to, antenna, one or more magnifier, tuner, one or more oscillator, user ID module (SIM) card, transceiver, coupler, LNA (Low Noise Amplifier), duplexer and etc. Additionally, RF circuit 110 can communicate with other devices via wireless mode and network.

The mentioned wireless communication can use any standard or protocol, includes but not limited to GSM (Global System of Mobile Communication), GPRS (General Packet Radio Service), CDMA (Code Division Multiple Access), WCDMA (Wideband Code Division Multiple Access), LTE (Long Term Evolution), email and SMS (Short Messaging Service).

Memory 120, which is used to store programs and their modules, such as the programs and modules corresponding to the server and the client for incremental update in example 2; processor 180 executes functional applications and data processing, such as incremental update, through programs and modules stored in memory 120. Memory 120 mainly includes program memory and data memory.

Program memory can store operating system, application with at least one function (such as sound playback, video playback, etc.); data memory can store data created in terminal 1200 (such as audio data, phone book). Memory 120 can includes speedy RAM, nonvolatile memory, one or more hard disk, flash disk, or other volatile memory. Memory 120 can also boast memory controller, thus to enable access of processor 180 and input unit 130 to it.

Input unit 130 can receive figures or characters, and generate input signal from keyboard mouse, operating lever, optical device and track ball and related to user set-up and function control. Input unit 130 can include touch-sensitive surface 131 and other input device 132.

Touch-sensitive surface 131, also called touch screen or touch-sensitive display, can collect user's operation on or around it (eg., operation of finger, touch pen and other applicable objects or accessories on or around touch-sensitive surface 131), and can drive corresponding connective device according to preset driver.

Optionally, touch-sensitive surface 131 may include touch detector and touch controller. Touch detector detects touch position and signal created on touch, and sends the signal to touch controller. Touch controller receives touching information via touch detector and transforms it into position coordinates before sending to processor 180. It receives and executes commands from processor 180.

Touch-sensitive surface 131 can be realized by way of resistance, capacitance, infrared or surface sound wave. Aside by touch-sensitive surface 131, input unit 130 may include other input device 132. Specifically, other input device 132 may include, but not limited to, one or more of physical keyboard, function keys (volume key, switch and etc.), trackball, mouse and operating lever.

Display unit 140 can display data input by users, information provided to users, and GUIs (graphic user interface) of terminal 1200. These GUIs comprise pictures, texts, icons, videos and any combination of such contents. Display unit 140 may include optional display panel 141, which servers as LCD (Liquid Crystal Display) or OLED (Organic Light-Emitting DI/Ode).

Additionally, touch-sensitive surface 131 can cover display panel 141. On detecting any operation on or near it, touch-sensitive surface 131 will transfer the signal to processor 180 to identify type of touch event. After this, processor 180 will provide corresponding video output on display panel 141 according to the type of touch event. In FIG. 12, touch-sensitive surface 131 and display panel 141 are used to input/output contents independently, but in some cases the two can be integrated to deliver input/output.

Terminal 1200 can boast at least one sensor 150, such as optical sensor, movement sensor and other sensors. To be specific, optical sensor may include ambient optical sensor and proximity sensor. Ambient optical sensor can adjust the brightness of display 141 according to ambient light. Proximity sensor can power off display panel 141 and/or the backlight when terminal 1200 move into the proximity to your ears. As one type of movement sensors, gravity acceleration sensor can detect acceleration magnitude in all directions (three axis usually).

During stabilization, it can detect gravity measurement and its direction, which can be used to applications (such as screen direction switch, related games, position calibration for magnetometer) to judge position of a mobile phone, as well as relevant functions (such as step counter, knock counter) capable of identifying vibration; Other sensors that can be attached to terminal 1200, such as gyroscope, barometer, hygrometer, thermometer, infrared sensor, will not be discussed here.

Audio circuit 160, speaker 161 and microphone 162 can provide audio interface between user and terminal 1200. Audio circuit 160 can transform aural signal to electric signal which will be transmitted to speaker 161 for audio output. Microphone 162 transforms received aural signal into electric signal, which will be transformed into electric signal before being transformed into aural data in audio circuit 160. Aural data will be sent to processor 180 for processing before passing RF circuit 110 and being sent to another terminal, or be output to memory 120 for further processing. Audio circuit 160 may include earplug hole to facilitate communication between headset and terminal 1200.

Terminal 1200 can help users to email, browsing webpage and access streaming media via transmission module 170, with wired or wireless internet access. Depicted in 12, transmission module 170 is not a necessary part of terminal 800 and it just can be spared to the extent that essence of the disclosure is not changed.

Serving as the control center of terminal 1200, processor 180 connects all parts of a mobile phone via lines and interfaces, executes programs and/or modules stored in memory 120 and calls data in memory 120 to execute functions of terminal 1200 and process data, thus to monitor the overall mobile phone.

Processor 180 may include one or more processing cores and it can integrate application processor and modulating-demodulating processor. Application processor is mainly used to process operating system, user interface and applications. Modulating-demodulating processor focuses on processing of wireless communication. It can be seen that it is unnecessary to integrate above-mentioned modulating-demodulating processor into processor 180.

Terminal 1200 mainly includes power supply 190 (such as battery) which is used to energize all parts. Power supply can be logically connected to processor 180 via power management system, thus to manage charging, discharging and power consumption through power management system. Power supply 190 can include one or more DC or AC power supply, recharging system, power failure detecting circuit, power transformer or inverter, power status indicator and other components.

Not shown in the figure, terminal 1200 may include camera, Bluetooth module and other components. To be specific, the terminal boasts a display unit of touch screen, memory, and one or more programs stored in the memory. After configuration, the processor executes above-mentioned program packages, which may include following operating instructions:

Unpack new version installation package to get a new version unpack folder which includes at least one new version Unpacking file and a new version signature subfolder which includes at least one new version Unpacking file;

Acquire header file information of each new version Unpacking file in the mentioned new version unpack folder, and transform format of header file information of each new version Unpacking file to get a new version conversion folder;

Pack the new version conversion folder into a new version archive file packet, and get at least one old version archive file packet;

Generate a corresponding differential file according to the new version archive file packet and each old version archive file packet, thus to get at least one differential file;

Issue at least one differential file, and the client will choose one of the differential file to download. Form a new version installation package according to the downloaded differential file, to complete incremental update.

Suppose the above method is the first implementation on which the second one is based. Memory of the mentioned terminal contains commands that can be used to execute following operations:

Header file data of new version unpacking file includes at least file length, filename length, checksum value, filename and contents, which are all in the second preset format;

Transform format header file information of each new version Unpacking file, and the operations include:

Extract file length, filename length, checksum value, filename and contents of header file information in each new version Unpacking file;

Transform format of file length, filename length, checksum value, filename and contents extracted into the first preset format.

In the third implementation that based on the first one, memory of the mentioned terminal can be used to execute following operations:

Including old version signature subfolder, the mentioned old version archive file packet's acquisition process assembles that of the mentioned new version archive file packet; A corresponding differential file is generated based on the mentioned new version archive file packet and each old version archive file packet, and this file includes:

Delete old version signature subfolder in each old version archive file packet, and generate a corresponding differential file based on the mentioned new version archive file packet and the old version archive file packet of which the old version signature subfolder is deleted.

As to the fourth implementation method based on the first to the third implementation method, memory of the mentioned terminal boasts commands for executing following operations:

To confirm whether there is a new version Unpacking file, used as identification file, in the new version Unpacking file under the new version Unpacking folder;

If there is a new version Unpacking file, delete it from the new version Unpacking folder.

In conclusion, the terminal in this example gets a new version Unpacking folder via a new version installation package, and transforms format of header file of a new version Unpacking file into a new version Unpacking folder, thus to acquire a new version conversion folder, which will be packed into a new version archive file packet later. After this, a differential file will be generated based on a new version archive file packet and a historical archive file packet, without destroying its data structure. This saved the differential data structure contents within differential file and reduced the size of differential file, thus reduced time and flow needed to download the differential file.

This disclosure provides an example that provides a computer-readable storage medium, which can be one of the above memories or independent computer-readable storage medium not installed in the terminal. When computer-readable storage medium stores one or more programs and one or more programs is/are executed on one or more processors to process objects, the mentioned methods include:

Unpack a new version installation package to get a new version Unpacking folder. The new version Unpacking folder includes at least one new version unpacked file one new version signature subfolder which includes at least one new version Unpacking file;

Acquire header file data of each new version Unpacking file in the new version Unpacking folder, and transform the header file data of each new version Unpacking file into a new version conversion folder;

Pack the new version conversion folder into a new version archive file packet, and acquire at least one old version archive file packet;

Generate a corresponding differential file based on the mentioned new version archive file packet and each old version archive file packet. At least one differential file will be generated;

Issue at least one differential file for the client to download, and generate a new version installation package based on the downloaded differential file, thus to complete incremental update.

It is supposed that the above case is the first implementation, and in the second implementation that based on the first one, the header file data of the new version Unpacking file includes at least file length, filename length, checksum value, filename and contents, and they are in the second preset format. Format conversion for header file data of each new version Unpacking file includes:

Extract file length, filename length, checksum value, filename and contents of header file data of each new version Unpacking file;

Transform format of the mentioned file length, filename length, checksum value, filename and contents extracted into the first preset format.

In the fourth implementation method based on the first to the third implementation methods, a new version unpacking folder is got with the following steps followed:

To confirm whether there is any new version Unpacking file, used as identification file, in the new version Unpacking file under the new version Unpacking folder;

If there is any, delete it from the new version Unpacking folder.

In computer-readable storage medium of this example, a new version Unpacking folder is got via new version installation package, and format of the header file of the new version Unpacking file in the new version unpack folder is transformed to generate a new version conversion folder which will be packed into a new version archive file packet later.

After that, a differential file will be generated on basis of the new version archive file package and the old version archive file package, without destroying data structure. This saved the differential data structure contents within differential file and reduced the size of differential file, thus reduced time and flow needed to download the differential file.

This disclosure also provides an example of a GUI (graphic user interface) in a terminal. The terminal boasts a touch screen, memory, at least one memory that used to execute one or more programs; the GUI comprises:

Unpack the new version installation package to get a new version Unpacking folder which includes at least one new version Unpacking file and a new version signature subfolder which includes at least one new version Unpacking file;

Acquire header file data of each new version Unpacking file in the mentioned new version Unpacking folder, and transform format of header file data to obtain a new version conversion folder;

Pack the mentioned new version conversion folder into a new version archive file packet, and acquire at least one old version archive file packet;

At least one differential file is acquired based on the mentioned new version archive file packet and each old version archive file packet;

Release at least one above-mentioned differential file for the client to download. After this, the new version installation packet will be generated based on the differential file, thus to completing the incremental update.

GUI (graphic user interface) in this disclosure example generates a new version Unpacking folder via a new version installation package, and transforms format of header file of the new version Unpacking file in the new version Unpacking folder; Pack the new version conversion folder into a new version archive file packet, generate a differential file based on the new version archive file packet and the old version archive file packet, without destroying data structure and reduced the size of the differential file. This reduced the size of differential file, thus reduced time and flow needed to download the differential file.

What to explain: in executing incremental update on the server and the client, take division of above functional modules as example. In actual application, modules can be assigned as required, namely, dividing internal structure of the server and the client into different module, to fulfill all or partial functions above. Additionally, above server, client, system and incremental update are depicted for planning, and see method examples for their implementation. We will not discuss them here.

Example numbers of the above-mentioned disclosure is for description only, and they do not symbolize any superiority of examples.

Common technicians of the industry can understand that all or partial procedures of above examples can be realized by hardware, or by commands on basis of hardware. The mentioned program can be stored in a computer-readable storage medium which may be non-transitory. Above storage medium can be read only memory, flash drive, hard disk or CR-ROM etc.

The mentioned examples are for the illustration purpose, they are not used to limit this disclosure. According to the disclosure and yardstick for this disclosure, any modification, equivalent replacement, improvement and so on should be under the protection scope of this disclosure.

The invention claimed is:

1. A method for updating software, comprising:
   unpacking, by a device with one or more processors, a new version installation package of the software to get a new version unpacked folder having at least one new version unpacked file;
   obtaining, by the device, header file information of the at least one new version unpacked file in the new version unpacked folder, and converting a format of the header file information of the at least one new version unpacked file and getting a new version convert folder, wherein the header file information comprises a file length, a file name length, a calibration value, a file name and data content in a second preset format;
   extracting, by the device, the file length, the file name length, the calibration value, the file name and the data content from the header file information; and
   converting, by the device, the file length, the file name length, the calibration value, the file name and that data content that are extracted from the second preset format to a first preset format;
   packing, by the device, the new version convert folder to a new version archive package and obtaining at least one historical version archive package;
   according to the new version archive package and the at least one historical version archive package, generating and obtaining, by the device, at least one differential file; and
   releasing, by the device, the at least one differential file wherein the at least one differential file that is released is selected by a client that has memory and at least one processor to download and form a second new version installation package according to the at least one differential file that is downloaded.

2. The method according to claim 1, wherein the unpacking comprises a new version signature subfolder having a least one new version unpacked file; and wherein the at least one historical version archive package comprises a historical version signature subfolder wherein the at least one historical version archive package is obtained by a process that is the same as the process to obtain the new version archive package;
   wherein the generating the at least one differential file comprises:
   deleting, by the device, the historical version signature subfolder in the historical version archive package, and generating the at least one differential file according to the new version archive package and the historical version archive package wherein the historical version signature subfolder is deleted.

3. The method according to any one of claim 1, further comprising:
   After the unpacking,
   determining, by the device, whether the at least one new version unpacked file is an identification file;
   if the at least one new version unpacked file is the identification file, deleting the at least one new version unpacked files from the new version unpacked folder.

4. A server for incremental software update, comprising:
   memory;
   one or more processors;
   an unpacking module stored in the memory and to be executed by the one or more processors for unpacking a new version installation package to get a new version unpacked folder having at least one new version unpacked file;
   a first acquisition module stored in the memory and to be executed by the one or more processors for obtaining header file information of the at least one new version unpacked file in the new version unpacked folder;
   a transforming module stored in the memory and to be executed by the one or more processors for converting a format of the header file information of the at least one new version unpacked file to a new version convert folder, wherein the header file information comprises a file length, a file name length, a calibration value, a file name and data content in a second preset format;
   a packing module stored in the memory and to be executed by the one or more processors for packing the new version convert folder to a new version archive package;

a second acquisition module stored in the memory and to be executed by the one or more processors for obtaining at least one historical version archive package;

a generating module stored in the memory and to be executed by the one or more processors for generating and obtaining at least one differential file according to the new version archive package and the at least one historical version archive package; and a release module stored in the memory and to be executed by the one or more processors for releasing the at least one differential file wherein the at least one differential file that is released is selected by a client to download and form a second new version installation package according to the at least one differential file that is downloaded.

5. The server according to claim 4,
wherein the transforming module comprises:
an extraction unit stored in the memory and to be executed by the one or more processors for extracting the file length, the file name length, the calibration value, the file name and the data content from the header file information; and a transformation unit stored in the memory and to be executed by the one or more processors for converting the file length, the file name length, the calibration value, the file name and that data content that are extracted from the second preset format to a first preset format.

6. The server according to claim 4, wherein the unpacking module is configured to get a new version signature subfolder having at least one new version unpacked file; wherein the at least one historical version archive package comprises a historical version signature subfolder wherein the at least one historical version archive package is obtained by a process that is the same as the process to obtain the new version archive package;

wherein the generating module stored in the memory and to be executed by the one or more processors is configured for:

deleting the historical version signature subfolder in the historical version archive package, and generating the at least one differential file according to the new version archive package and the historical version archive package wherein the historical version signature subfolder is deleted.

7. The server according to any one of claim 4, further comprising:

a confirmation module stored in the memory and to be executed by the one or more processors for determining whether the at least one new version unpacked file is an identification file; and a deletion module stored in the memory and to be executed by the one or more processors for deleting the at least one new version unpacked files from the new version unpacked folder if the at least one new version unpacked file is the identification file.

8. A method for updating a software, comprising:
acquiring, by a device having one or more processors, a historical version installation package that corresponds to the software installed on the device, and downloading a differential file corresponding to the historical version installation package from a server;

unpacking, by the device, the historical version installation package, and getting a historical version unpacked folders wherein the historical version unpacked folder comprises at least one historical version unpacked file and a historical version signature subfolder comprising at least one historical version unpacked file;

obtaining, by the device, header file information of the at least one historical version unpacked file, and converting a format of the header file information of the at least one historical version unpacked file to a historical version transformed folder;

packing, by the device, the historical version transformed folder into a historical version archive file package, and getting a new version archive file package according to the historical version archive file package and the differential file;

unpacking, by the device, the new version archive file package, and getting a new version transformed folder;

obtaining, by the device, header file information of files in the new version transformed folder, and converting a format of the header file information of files to a plurality of new version unpacked files; and getting, by the device, the new version installation package based on the plurality of new version unpacked files.

9. The method according to claim 8, wherein a number of the historical version installation package is at least two;
wherein the acquiring the historical version installation packages comprises:
getting, by the device, a version number of the historical version installation package, and choosing the historical version installation package according to the version number wherein the version number is the biggest.

10. The method according to claim 8, wherein the header file information of the at least one historical version unpacked file comprises a file length, a file name length, a calibration value, a file name and data content in a first format;

wherein the converting the format of the header file information of the at least one historical version unpacked file comprises:

extracting, by the device, the file length, the file name length, the calibration value, the file name and the data content from the header file information of the at least one historical version unpacked file;

converting, by the device, the file length, the file name length, the calibration value, the file name from the first format into a second format.

11. The method according to claim 8, wherein the getting a new version archive file package according to the historical version archive file package and the differential file comprises:

deleting, by the device, the historical version signed subfolder in the historical version archive file package, merging the historical version archive file package with the differential file to get a new version archive file package wherein the historical version signature subfolder is deleted.

12. The method according to any one of claim 8, further comprising:
after the getting the historical version unpacked folder,
determining, by the device, whether the at least one historical version unpacked file is an identification file;
if the at least one historical version unpacked file is the identification file, deleting the at least one historical version unpacked file from the historical version unpacked folder.

13. The method according to claim 8, wherein the header file information of the files in the new version transformed folder comprises a file length, a file name length, a calibration value, a file name and data content in a first format;
wherein the converting the format of the header file information of the files in the new version transformed folder comprises:

extracting, by the device, the file length, the file name length, the calibration value, the file name and the data content from the header file information of files in the new version transformed folder;

converting, by the device, the extracted file length, the file name length, the calibration value, the file name and the data content from the first format into a second format.

14. A client device, comprising:
memory;
one or more processors;
a first acquisition module stored in the memory and to be executed by the one or more processors for acquiring a historical version installation package;
a downloading module stored in the memory and to be executed by the one or more processors downloading a differential file corresponding to the historical version installation package from a server;
a first unpacking module stored in the memory and to be executed by the one or more processors for unpacking the historical version installation package, and getting a historical version unpacked folders wherein the historical version unpacked folder comprises at least one historical version unpacked file and a historical version signature subfolder comprising at least one historical version unpacked file;
a second acquisition module stored in the memory and to be executed by the one or more processors for header file information of the at least one historical version unpacked file in the historical version unpacked folder;
a first transforming module stored in the memory and to be executed by the one or more processors for converting a format of the header file information of the at least one historical version unpacked file to a historical version transformed folder;
a packing module stored in the memory and to be executed by the one or more processors for packing the historical version transformed folder into a historical version archive file package;
a third acquisition module stored in the memory and to be executed by the one or more processors for acquiring a new version archive file package according to the historical version archive file package and the differential file;
a second unpacking module stored in the memory and to be executed by the one or more processors for unpacking the new version archive file package, and getting a new version transformed folder;
a fourth acquisition module stored in the memory and to be executed by the one or more processors for acquiring header file information of files in the new version transformed folder;
a second transforming module stored in the memory and to be executed by the one or more processors for converting a format of the header file information of files in the new version transformed folder to a plurality of new version unpacked files;
a fifth acquisition module stored in the memory and to be executed by the one or more processors for acquiring the new version installation package based on the plurality of new version unpacked files.

15. The client device according to claim 14, wherein a number of the historical version installation package is at least two;
wherein the first acquisition module stored in the memory and to be executed by the one or more processors obtains a version number of the historical version installation package, and chooses the historical version installation package according to the version number wherein the version number is the biggest.

16. The client device according to claim 14, wherein the header file information of the at least one historical version unpacked file comprises a file length, a file name length, a calibration value, a file name and data content in a first format;
wherein the first transforming module comprises:
an extraction unit stored in the memory and to be executed by the one or more processors for extracting the file length, the file name length, the calibration value, the file name and the data content from the header file information of the at least one historical version unpacked file; and
a transformation unit stored in the memory and to be executed by the one or more processors for converting the file length, the file name length, the calibration value, the file name from the first format into a second format.

17. The client device according to claim 14, wherein the third acquisition module stored in the memory and to be executed by the one or more processors is for deleting the historical version signed subfolder in the historical version archive file package, and merging the historical version archive file package with the differential file to get a new version archive file package wherein the historical version signature subfolder is deleted.

18. The client device according to any one of claim 14, further comprising:
a confirmation module stored in the memory and to be executed by the one or more processors for determining whether the at least one historical version unpacked file is an identification file;
a storage module stored in the memory and to be executed by the one or more processors for saving the at least one historical version unpacked file if the at least one historical version unpacked file is the identification file; and
a deletion module stored in the memory and to be executed by the one or more processors for deleting the at least one historical version unpacked from the historical version unpacked folder if the at least one historical version unpacked file is the identification file.

19. The client device according to claim 14, wherein the header file information of the files in the new version transformed folder comprises a file length, a file name length, a calibration value, a file name and data content in a first format;
wherein the second transforming module comprises:
an extraction unit stored in the memory and to be executed by the one or more processors for extracting the file length, the file name length, the calibration value, the file name and the data content from the header file information of files in the new version transformed folder; and
a transformation unit stored in the memory and to be executed by the one or more processors for converting the extracted file length, the file name length, the calibration value, the file name and the data content from the first format into a second format.

* * * * *